(12) United States Patent
Zhu et al.

(10) Patent No.: US 11,477,708 B2
(45) Date of Patent: Oct. 18, 2022

(54) PACKET SWITCHED VOICE CALL CAPABILITY INDICATION IN WIRELESS COMMUNICATIONS

(71) Applicant: QUALCOMM Incorporated, San Diego, CA (US)

(72) Inventors: Xipeng Zhu, San Diego, CA (US); Masato Kitazoe, Hachiouji (JP); Tom Chin, San Diego, CA (US); Gavin Bernard Horn, La Jolla, CA (US); Haris Zisimopoulos, London (GB); Shyamal Ramachandran, San Diego, CA (US); Min Wang, San Diego, CA (US); Aziz Gholmieh, Del Mar, CA (US); Ajith Payyappilly, San Diego, CA (US); Luis Fernando Brisson Lopes, Swindon (GB)

(73) Assignee: QUALCOMM Incorporated, San Diego, CA (US)

( * ) Notice: Subject to any disclaimer, the term of this patent is extended or adjusted under 35 U.S.C. 154(b) by 69 days.

(21) Appl. No.: 16/445,926

(22) Filed: Jun. 19, 2019

(65) Prior Publication Data

US 2019/0394688 A1 Dec. 26, 2019

(30) Foreign Application Priority Data

Jun. 21, 2018 (GR) .............................. 20180100274

(51) Int. Cl.
*H04W 36/00* (2009.01)
*H04L 5/14* (2006.01)
(Continued)

(52) U.S. Cl.
CPC ....... *H04W 36/0066* (2013.01); *H04L 5/1438* (2013.01); *H04M 7/0066* (2013.01);
(Continued)

(58) Field of Classification Search
CPC ......... H04W 36/0066; H04W 36/0058; H04W 8/24; H04W 72/048; H04W 8/22; H04L 5/1438; H04M 7/0066
See application file for complete search history.

(56) References Cited

U.S. PATENT DOCUMENTS 11,039,303 B2 * 6/2021 Ljung ..................... H04W 8/22
2012/0284739 A1 * 11/2012 Gunther .................. H04L 65/80
725/18

(Continued)

OTHER PUBLICATIONS

"3rd Generation Partnership Project; Technical Specification Group Radio Access Network; Evolved Universal Terrestrial Radio Access (E-UTRA); User Equipment (UE) Radio Access Capabilities (Release 15)", 3GPP Standard; Technical Specification; 3GPP TS 36.306, 3rd Generation Partnership Project (3GPP), Mobile Competence Centre; 650, Route Des Lucioles; F-06921 Sophia-Antipolis Cedex; France, vol. RAN WG2, No. V15.0.0, Apr. 3, 2018, pp. 1-86, XP051450929, [retrieved on Apr. 3, 2018] paragraph [0001] paragraph [0004] paragraph [4.3.14].

(Continued)

*Primary Examiner* — Walter J Divito
*Assistant Examiner* — Anthony Luo
(74) *Attorney, Agent, or Firm* — Holland & Hart LLP/Qualcomm Incorporated

(57) ABSTRACT

Methods, systems, and devices for wireless communications are described that provide for a user equipment (UE) to report packet switched voice call capabilities to a base station. The UE may explicitly report voice call capabilities via one or more system-level parameters that are transmitted to the base station. The base station may operate in a first radio access network (RAN), such as a 5G or new radio (NR) RAN. In cases where the UE indicates a capability for packet switched voice calls via the first RAN, one or more voice calls may be established with the UE via the first RAN. In cases where the UE indicates that it is not capable of packet switched voice calls via the first RAN, the UE may fall back to a different RAN (e.g., a 4G or LTE RAN, a 3G RAN, or a 2G RAN) for voice calls.

26 Claims, 20 Drawing Sheets

(51) Int. Cl.
*H04M 7/00* (2006.01)
*H04W 8/24* (2009.01)
*H04W 72/04* (2009.01)
*H04W 8/22* (2009.01)

(52) U.S. Cl.
CPC ......... *H04W 8/24* (2013.01); *H04W 36/0058* (2018.08); *H04W 72/048* (2013.01); *H04W 8/22* (2013.01)

(56) References Cited

U.S. PATENT DOCUMENTS

| | | | |
|---|---|---|---|
| 2014/0204901 A1* | 7/2014 | Hedman | H04W 36/0022 370/331 |
| 2015/0222446 A1 | 8/2015 | Suresh et al. | |
| 2016/0219475 A1* | 7/2016 | Kim | H04W 76/27 |
| 2018/0146365 A1* | 5/2018 | Dhanapal | H04W 8/183 |
| 2018/0332441 A1* | 11/2018 | Shaw | H04L 41/12 |
| 2019/0082317 A1* | 3/2019 | Gaal | H04L 5/0046 |
| 2019/0313234 A1* | 10/2019 | Liu | H04W 8/02 |

OTHER PUBLICATIONS

Huawei et al: "Discussion on the Details of Voice Capability," 3GPP Draft; R2-1812942, 3rd Generation Partnership Project (3GPP), Mobile Competence Centre; 650, Route Des Lucioles; F-06921 Sophia-Antipolis Cedex; France, vol. RAN WG2, No. Montreal, Canada; Jul. 2, 2018-Jul. 6, 2018, Aug. 15, 2018, XP051522526, Retrieved from the Internet: URL: http://www.3gpp.org/ftp/tsg%5Fran/WG2%5FRL2/TSGR2%5F103/Docs/R2%2D1812942%2Ezip [retrieved on Aug. 15, 2018] p. 1-p. 5.

International Search Report and Written Opinion—PCT/US2019/038157—ISA/EPO—dated Spe. 30, 2019 (183810WO).

Qualcomm Incorporated et al: "VoIP Continuity Between LTE and UMTS", 3GPP Draft; 36331_CRXXXX_(REL-9)_R2-122391 Addition of VoIP UE Capabilities, 3rd Generation Partnership Project (3GPP), Mobile Competence Centre; 650, Route Des Lucioles; F-06921 Sophia-Antipolis Cedex; France, vol. RAN WG2, No. Prague, Czech Republic; May 25, 2012, May 14, 2012, XP050606883, [retrieved on May 14, 2012] p. 1-p. 8.

Qualcomm Incorporated et al: "Voice Over PS Continuity," 3GPP Draft; 36331_CR0939R1_(REL-10)_RP-120685, 3rd Generation Partnership Centre; 650, Route Des Lucioles; F-06921 Sophia-Antipolis Cedex; France, vol. TSG RAN, No. Ljubljana, Slovenia; Jun. 13, 2012-Jun. 15, 2012, Jun. 6, 2012, XP051630783, Retrieved from the Internet: URL: http://www.3gpp.org/ftp/tsg%5Fran/TSG%5FRAN/TSGR%5F56/Docs/RP%2D120685%2Ezip [retrieved on Jun. 6, 2012] p. 1-p. 17.

Qualcomm Incorporated: "UE Radio Capability for IMS Voice", 3GPP Draft; R2-1811127, 3rd Generation Partnership Project (3GPP), Mobile Competence Centre; 650, Route Des Lucioles; F-06921 Sophia-Antipolis Cedex; France, vol. RAN WG2, No. Gothenburg, Sweden; Aug. 20, 2018-Aug. 24, 2018, Aug. 10, 2018, XP051520820, Retrieved from the Internet: URL: http://www.3gpp.org/ftp/tsg%5Fran/WG2%5FRL2/TSGR2%5F103/Docs/R2%2D1811127%2Ezip [retrieved on Aug. 10, 2018] p. 1-p. 6.

* cited by examiner

PACKET SWITCHED VOICE CALL CAPABILITY INDICATION IN WIRELESS COMMUNICATIONS

CROSS REFERENCE

The present application for patent claims the benefit of Greece Provisional Patent Application No. 20180100274 by ZHU, et al., entitled "PACKET SWITCHED VOICE CALL CAPABILITY INDICATION IN WIRELESS COMMUNICATIONS," filed Jun. 21, 2018, assigned to the assignee hereof, and expressly incorporated herein.

BACKGROUND

The following relates generally to wireless communications, and more specifically to packet switched voice call capability indication in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some deployments, voice calls may be conducted using packet switching, such as voice over Internet protocol (VoIP), voice over LTE (VoLTE) for some LTE deployments, or voice over NR (VoNR) for some NR deployments. Packet switched voice calls may be generally referred to as voice over packet switching (VoPS). In other deployments, voice calls may be conducted with circuit switching (CS). Further, in some cases, a packet-based wireless communications system (e.g., an LTE or NR system), or one or more UEs operating within the system, may not have a capability of supporting VoPS, and fallback techniques may be implemented to establish the voice call using a different radio access technology. For example, a NR system or UE operating within the system may not support VoNR, and the UE may fallback to an LTE system, or a 3G or 2G system, when establishing a voice call. Efficient techniques for implementing such fallback techniques may be beneficial to help enhance network efficiency.

SUMMARY

The described techniques relate to improved methods, systems, devices, and apparatuses that support packet switched voice call capability indication in wireless communications. In various aspects, described techniques provide for a user equipment (UE) to report packet switched voice call capabilities to a base station. A UE may transmit a system-level parameter to the base station that indicates whether the UE has a capability to support packet switched voice calls. In some examples, the base station may operate in a first radio access network (RAN), such as a 5G or new radio (NR) RAN. In cases where the UE indicates a capability for packet switched voice calls via the first RAN, one or more voice calls may be established with the UE via the first RAN. In cases where the UE indicates that it is not capable of packet switched voice calls via the first RAN, the UE may fall back to a different RAN (e.g., a 4G or LTE RAN, a 3G RAN, or a 2G RAN) for voice calls.

In some cases, the UE may provide a number of capability bits indicating different capabilities of the UE. Such capability bits may include, for example, an indication of UE capability to support packet switched voice calls via frequency division duplexing (FDD) using the first RAN, an indication of UE capability to support packet switched voice calls via time division duplexing (TDD) using the first RAN, an indication of UE capability to support packet switched voice calls in a higher frequency range (e.g., via beamformed transmissions in a frequency range above 6 GHz (e.g., FR2)) using the first RAN, or combinations thereof. In some cases, the system parameters may include one or more indications of capabilities of the UE to support packet switched voice calls via a second RAN (e.g., a 4G or LTE RAN), such as an indication of UE capability for frequency division duplexing (FDD) for voice calls via the second RAN, time division duplexing (TDD) for voice calls via the second RAN, or combinations thereof. Additionally or alternatively, the system parameters may include an indication of UE capability for single radio voice call continuity (SRVCC) to hand over a voice call from a packet switched domain to a circuit switched domain.

In some cases, a UE may also initiate a connection establishment procedure with a second base station to establish a second wireless connection using a second RAN, and may transmit, as part of the second connection establishment, a second system-level parameter that indicates whether the UE has the capability to support packet switched voice calls via the first RAN. In some cases, base stations may receive a list of restricted tracking areas (TAs) or base stations that are restricted from receiving a handover of packet switched voice calls, which may prevent a UE with an established VoPS call from being handed over to a base station that does not support VoPS.

A method of wireless communication at a UE is described. The method may include initiating a connection establishment with a base station to establish a wireless connection using a first radio access network (RAN), transmitting, to the base station, a system-level parameter that indicates whether the UE has a capability to support packet switched voice calls via the first RAN and one or more capability bits for component features of packet switched voice calls, and communicating with the base station using the first RAN based on the system-level parameter.

An apparatus for wireless communication at a UE is described. The apparatus may include a processor, memory in electronic communication with the processor, and instructions stored in the memory. The instructions may be executable by the processor to cause the apparatus to initiate a connection establishment with a base station to establish a wireless connection using a first radio access network (RAN), transmit, to the base station, a system-level parameter that indicates whether the UE has a capability to support packet switched voice calls via the first RAN and one or more capability bits for component features of packet switched voice calls, and communicate with the base station using the first RAN based on the system-level parameter.

Another apparatus for wireless communication at a UE is described. The apparatus may include means for initiating a connection establishment with a base station to establish a wireless connection using a first radio access network (RAN), transmitting, to the base station, a system-level parameter that indicates whether the UE has a capability to support packet switched voice calls via the first RAN and one or more capability bits for component features of packet switched voice calls, and communicating with the base station using the first RAN based on the system-level parameter.

A non-transitory computer-readable medium storing code for wireless communication at a UE is described. The code may include instructions executable by a processor to initiate a connection establishment with a base station to establish a wireless connection using a first radio access network (RAN), transmit, to the base station, a system-level parameter that indicates whether the UE has a capability to support packet switched voice calls via the first RAN and one or more capability bits for component features of packet switched voice calls, and establish the connection with the base station using the first RAN based on the system-level parameter.

Some examples of the method, apparatuses, and non-transitory computer-readable medium described herein may further include operations, features, means, or instructions for establishing a voice call via the first RAN based on the system-level parameter indicating that the UE may be capable to support packet switched voice calls via the first RAN. Some examples of the method, apparatuses, and non-transitory computer-readable medium described herein may further include operations, features, means, or instructions for receiving a handover or redirect command to a second RAN based on the system-level parameter indicating that the UE lacks the capability to support packet switched voice calls via the first RAN. In some examples of the method, apparatuses, and non-transitory computer-readable medium described herein, the first RAN may be a 5G or new radio (NR) RAN, and the second RAN may be a 4G, 3G, or 2G RAN.

In some examples of the method, apparatuses, and non-transitory computer-readable medium described herein, the transmitting further may include operations, features, means, or instructions for transmitting a set of system parameters for capabilities of vertical features that involve two or more protocol layers. In some examples of the method, apparatuses, and non-transitory computer-readable medium described herein, the system-level parameter may include a first capability bit that indicates UE capability to support packet switched voice calls via FDD using the first RAN, and where the transmitting further includes and transmitting a second capability bit that indicates UE capability to support packet switched voice calls via TDD using the first RAN, and a third capability bit that indicates UE capability to support packet switched voice calls via transmissions in a higher frequency range (e.g., FR2) using the first RAN.

In some examples of the method, apparatuses, and non-transitory computer-readable medium described herein, the transmitting further may include operations, features, means, or instructions for transmitting an indication of a second capability of the UE to support packet switched voice calls via a second RAN. In some examples of the method, apparatuses, and non-transitory computer-readable medium described herein, the indication of the second capability of the UE indicates UE capability for FDD for voice calls via the second RAN, TDD for voice calls via the second RAN, or combinations thereof. In some examples of the method, apparatuses, and non-transitory computer-readable medium described herein, the indication of the second capability of the UE indicates UE capability for single radio voice call continuity (SRVCC) to hand over a voice call from a packet switched domain to a circuit switched domain.

Some examples of the method, apparatuses, and non-transitory computer-readable medium described herein may further include operations, features, means, or instructions for initiating a second connection establishment with a second base station to establish a second wireless connection using a second RAN and transmitting, to the second base station, a second system-level parameter that indicates whether the UE may have the capability to support packet switched voice calls via the first RAN.

A method of wireless communication is described. The method may include initiating, at a base station in a first radio access network (RAN), a connection establishment with a UE, receiving, from the UE, a system-level parameter that indicates whether the UE has a capability to support packet switched voice calls via the first RAN and one or more capability bits for component features of packet switched voice calls, and communicating with the UE based on the system-level parameter.

An apparatus for wireless communication is described. The apparatus may include a processor, memory in electronic communication with the processor, and instructions stored in the memory. The instructions may be executable by the processor to cause the apparatus to initiate, at a base station in a first radio access network (RAN), a connection establishment with a UE, receive, from the UE a system-level parameter that indicates whether the UE has a capability to support packet switched voice calls via the first RAN and one or more capability bits for component features of packet switched voice calls, and communicate with the UE based on the system-level parameter.

Another apparatus for wireless communication is described. The apparatus may include means for initiating, at a base station in a first radio access network (RAN), a connection establishment with a UE, receiving, from the UE, a system-level parameter that indicates whether the UE has a capability to support packet switched voice calls via the first RAN and one or more capability bits for component features of packet switched voice calls, and communicate with the UE based on the system-level parameter.

A non-transitory computer-readable medium storing code for wireless communication is described. The code may include instructions executable by a processor to initiate, at a base station in a first radio access network (RAN), a connection establishment with a UE, receive, from the UE, a system-level parameter that indicates whether the UE has a capability to support packet switched voice calls via the first RAN and one or more capability bits for component features of packet switched voice calls, and communicate with the UE based on the system-level parameter.

Some examples of the method, apparatuses, and non-transitory computer-readable medium described herein may further include operations, features, means, or instructions for establishing a voice call for the UE via the first RAN based on the system-level parameter indicating that the UE may be capable to support packet switched voice calls via the first RAN. In some examples of the method, apparatuses, and non-transitory computer-readable medium described herein, the system-level parameter indicates that the UE lacks the capability to support packet switched voice calls via the first RAN, and the UE may be handed over or redirected to a second base station of a second RAN to establish the voice call. In some examples of the method, apparatuses, and non-transitory computer-readable medium described herein, the first RAN may be a 5G or new radio (NR) RAN, and the second RAN may be a 4G, 3G, or 2G RAN.

In some examples of the method, apparatuses, and non-transitory computer-readable medium described herein, the receiving further may include operations, features, means, or instructions for receiving a set of system parameters for capabilities of vertical features of the UE that involve two or more protocol layers. In some examples of the method, apparatuses, and non-transitory computer-readable medium described herein, the system-level parameter may include a first capability bit that indicates UE capability to support packet switched voice calls via FDD using the first RAN, and where the receiving further may include operations, features, means, or instructions for receiving, from the UE, a second capability bit that indicates UE capability to support packet switched voice calls via TDD using the first RAN, and a third capability bit that indicates UE capability to support packet switched voice calls via transmissions in a higher frequency range (e.g., FR2) using the first RAN.

In some examples of the method, apparatuses, and non-transitory computer-readable medium described herein, the receiving further may include operations, features, means, or instructions for receiving an indication of a second capability of the UE to support packet switched voice calls via a second RAN. In some examples of the method, apparatuses, and non-transitory computer-readable medium described herein, the indication of the second capability of the UE indicates UE capability for FDD for voice calls via the second RAN, TDD for voice calls via the second RAN, or combinations thereof.

Some examples of the method, apparatuses, and non-transitory computer-readable medium described herein may further include operations, features, means, or instructions for initiating a handover of the UE to a second base station of the second RAN based on the indication of the second capability of the UE. In some examples of the method, apparatuses, and non-transitory computer-readable medium described herein, the indication of the second capability of the UE indicates UE capability for single radio voice call continuity (SRVCC) to hand over a voice call from a packet switched domain to a circuit switched domain.

Some examples of the method, apparatuses, and non-transitory computer-readable medium described herein may further include operations, features, means, or instructions for receiving a list of other base stations that may be restricted from establishing packet switched voice calls and initiating a handover of the UE to a second base station for a voice call based on the list of other base stations that may be restricted from establishing packet switched voice calls.

DETAILED DESCRIPTION

Figure 1:
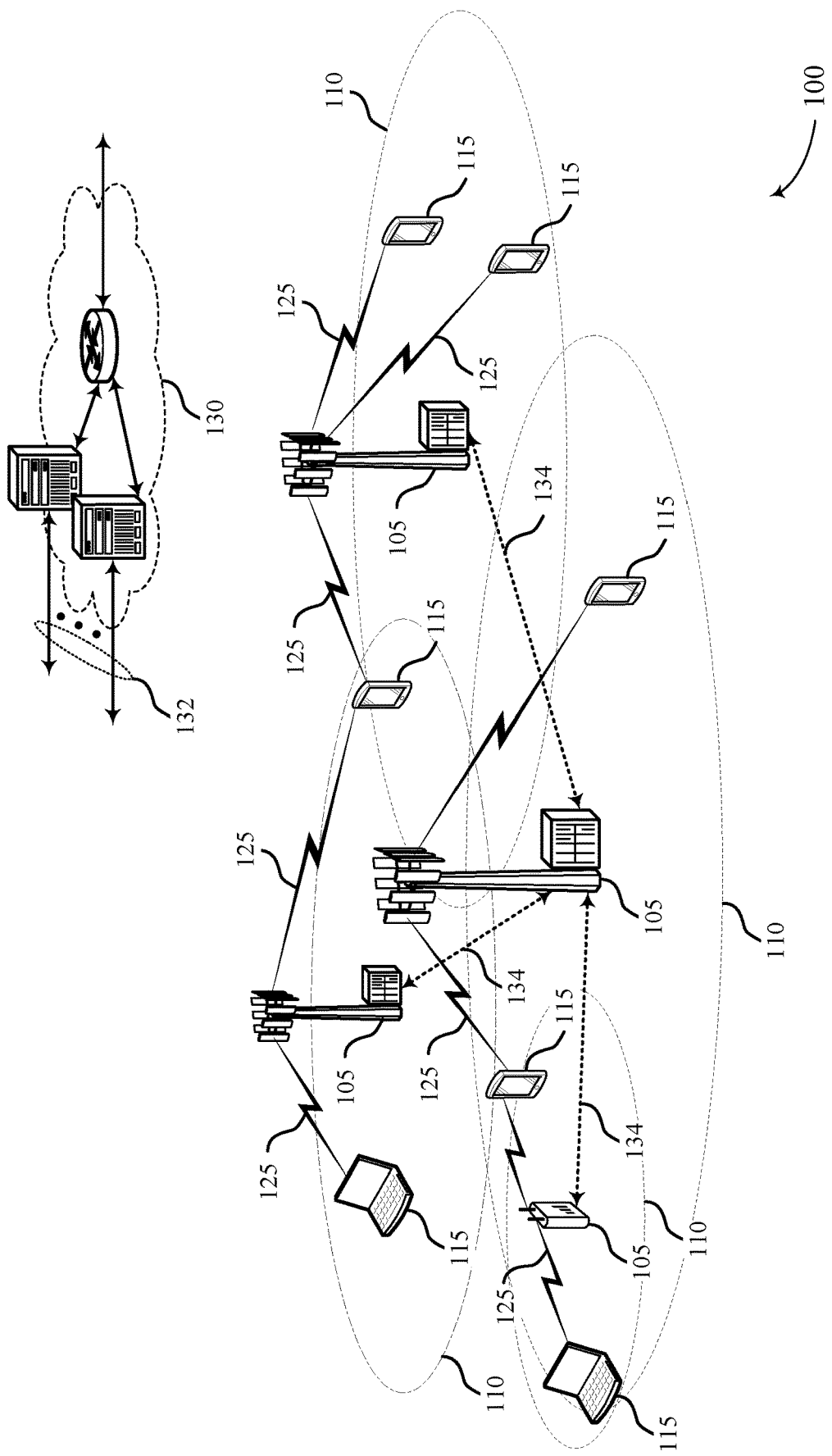
FIG. 1 illustrates an example of a system for wireless communications that supports packet switched voice call capability indication in wireless communications in accordance with aspects of the present disclosure.

Various aspects of the present disclosure provide methods, systems, devices, and apparatuses that support packet switched voice call capability indication in wireless communications. Described techniques provide for a user equipment (UE) to report packet switched voice call capabilities to a base station. In some cases, a UE may transmit one or more system-level parameters to the base station that indicates whether the UE has a capability to support packet switched voice calls that may be served by the base station.

As indicated above, in some cases one or more UEs operating within a system may have a capability of supporting voice over packet switching (VoPS), and one or more other UEs operating within the system may not have the capability of supporting VoPS. In cases where a UE does not have VoPS capability for a particular radio access network (RAN) (e.g., a 5G or new radio (NR) RAN), the system-level parameters provided by the UE may indicate its VoPS capabilities. For example, in some initial 5G or new radio (NR) deployments, voice over NR (VoNR) may not be initially available. Further, for some UEs that may provide NR connectivity, VoNR may not be initially available. VoNR may be initially unavailable, in some cases, even when the RAN or the UE supports each of a number of individual feature groups that may be used for VoNR, testing and optimization may not have advanced sufficiently for full support of VoNR calls. In cases where a first RAN may not support VoNR in an initial deployment, connections established via the first RAN may use fallback (FB) techniques to route voice calls through a different RAN (e.g., voice calls may FB to a 4G, 3G, or 2G RAN). Once the first RAN has capability to support VoNR calls, voice calls may still use FB to a different RAN in cases where a UE does not have capability for VoNR calls. In some cases, however, certain UEs may be able to perform VoNR calls while other UEs lack such capabilities. Thus, system-level parameter indications of UE capabilities such as discussed herein may allow a base station to differentiate UEs with different VoPS capabilities and route voice calls accordingly. Such techniques may help enhance network efficiency by reducing latency associated with attempted voice call establishments that fail due to UEs being incapable of voice calls via a particular RAN.

In some cases, the UE may provide a number of capability bits indicating different capabilities of the UE. Such capability bits may include, for example, an indication of UE capability to support packet switched voice calls via frequency division duplexing (FDD) using the first RAN, an indication of UE capability to support packet switched voice calls via time division duplexing (TDD) using the first RAN, an indication of UE capability to support packet switched voice calls in a higher frequency range (e.g., via beamformed transmissions in a frequency range above 6 GHz (e.g., FR2)) using the first RAN, or combinations thereof. In some cases, the system parameters may include one or more indications of capabilities of the UE to support packet switched voice calls via a second RAN (e.g., a 4G or LTE RAN), such as an indication of UE capability for FDD for voice calls via the second RAN, TDD for voice calls via the second RAN, or combinations thereof. Additionally or alternatively, the system parameters may include an indication of UE capability for single radio voice call continuity (SRVCC) to handover a voice call from a packet switched domain to a circuit switched domain.

In some cases, a UE may also initiate a connection establishment with a second base station to establish a second wireless connection using a second RAN, and may transmit, as part of the second connection establishment, a second system-level parameter that indicates whether the UE has the capability to support packet switched voice calls via the first RAN. In some cases, base stations may receive a list of restricted tracking areas (TAs) or base stations that are restricted from receiving a handover of packet switched voice calls, which may prevent a UE with an established VoPS call from being handed over to a base station that does not support VoPS.

Aspects of the disclosure are initially described in the context of a wireless communications system. Aspects of the disclosure are further illustrated by and described with reference to apparatus diagrams, system diagrams, and flowcharts that relate to packet switched voice call capability indication in wireless communications.

FIG. 1 illustrates an example of a wireless communications system 100 that supports packet switched voice call capability indication in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices. In some cases, the wireless communications system 100 may support VoPS calls, and one or more UEs 115 may provide indications to base stations 105 that indicate UE capability for supporting VoPS calls.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

In some cases, wireless communications system 100 may be deployed as part of a NR RAN that has capability for VoPS voice calls. UEs 115, in some case, may report VoPS voice call capabilities to a base station 105. In some cases, a UE 115 may transmit a system-level parameter to a serving base station 105 that indicates whether the UE 115 has a capability to support VoPS voice calls. In some examples, the UE 115 may provide the system-level parameter indication to a base station 105 when establishing a connection with the base station 105. In other cases, after a connection is established a base station 105 may send a UE 115 a capability enquiry request that the UE 115 report VoPS capability. The system-level parameter may include an explicit indication of the UE 115 capability for VoPS voice calls via the NR RAN. In cases where the UE 115 indicates that it is not capable of VoPS voice calls via the NR RAN, the UE 115 may fall back to a different RAN (e.g., a 4G or LTE RAN, a 3G RAN, or a 2G RAN) for voice calls.

Figure 2:
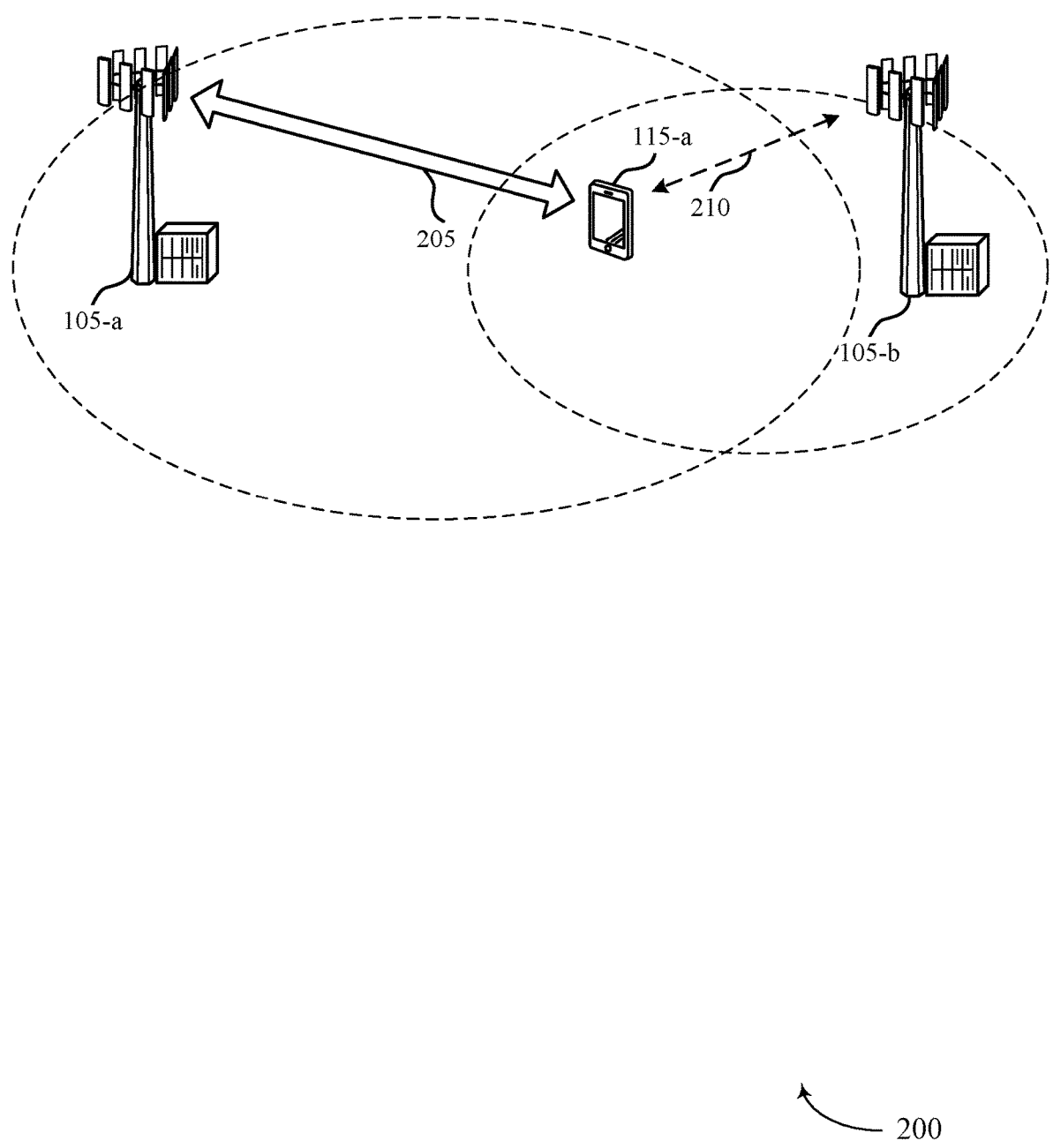
FIG. 2 illustrates an example of a portion a wireless communications system that supports packet switched voice call capability indication in wireless communications in accordance with aspects of the present disclosure.

FIG. 2 illustrates an example of a wireless communications system 200 that supports packet switched voice call capability indication in wireless communications in accordance with aspects of the present disclosure. In some examples, wireless communications system 200 may implement aspects of wireless communications system 100. Wireless communications system 200 may include a first base station 105-a that operates in a 5G or NR RAN, a second base station 105-b that operates in a different RAN (e.g., a 4G or LTE RAN, a 3G RAN, or a 2G RAN), and a UE 115-a.

In the example, of FIG. 2, the UE 115-a may establish a connection in the first RAN via a communications link 205 with the first base station 105-a. In some cases, as part of a connection establishment procedure that is used to establish the communications link 205, or in response to a capability enquiry from the first base station 105-a, the UE 115-a may provide the first base station 105-a with one or more system parameters that indicate VoPS capabilities of the UE 115-a. In some cases, the system parameters may indicate that the UE 115-a is not capable of VoPS calls via the communications link 205, and in the event of a voice call to the UE 115-a, a second link 210 may be established between the UE 115-a and the second base station 105-b, which may operate in a second RAN that is different than the first RAN. In some cases, the second RAN may be a 4G or LTE RAN that provides VoLTE voice call fallback for the first base station 105-a, or a 3G or 2G RAN that provides circuit switched (CS) voice call fallback for the first base station 105-a.

In some cases, the second base station 105-b may operate in an LTE RAN, and packet switched voice call support may be determined based on a series of radio features from a specified radio feature list that is associated with VoLTE support. Thus, in some established LTE deployments, VoLTE capability support may be determined based on a set of features in the radio feature list that are supported by the UE 115-a, and an explicit indication of VoLTE support may not be provided by the UE 115-a. However, in some cases supporting all these same features in NR does not mean that the UE 115-a supports VoNR. This may occur in cases where testing and optimizations for reliable VoNR voice calling may not be complete. In some cases, an older UE 115-a may not support VoNR, but a newer device may support VoNR. Further, in some cases, an older device may receive a software update, after which the device may support VoNR. Thus, various aspects of the present disclosure provide for explicit indication of whether the UE 115-a supports VoNR, or various different types of VoNR (e.g., VoNR using TDD, FDD, or FR2).

The first base station 105-a may receive the capability indications from the UE 115-a (e.g., via system parameter indications and capability bits transmitted by the UE 115-a), and may determine VoNR support status and make an accurate decision of whether to service a voice call via VoNR or to fallback and have the second base station 105-b establish the voice call. In some cases, during a connection establishment (or connection reestablishment) or in response to a capability enquiry, the UE 115-a may transmit system parameters that indicate UE-NR-Capability for vertical features (e.g. VoPS) which involve multiple protocol layers. In some cases, the capability indication provided by the UE 115-a may include a number of separate VoPS capability bits, which may indicate, for example, that VoPS is supported for NR-FDD, NR-TDD, or beamformed transmissions using high frequency (e.g., FR2) spectrum, such as radio frequencies that are greater than 6 GHz.

In some cases, the second base station 105-b, as discussed above, may be deployed in a 4G or LTE RAN. As discussed above, in some cases determination of whether the UE 115-a is capable of VoLTE is made based on features of a radio feature list that are supported by the UE 115-a. In cases there the UE 115-a is not capable of VoLTE, the UE 115-a may need to fallback to a CS network (e.g., a 3G or 2G RAN) for establishment of a voice call. In some cases, rather than having the first base station 105-a decode the UE 115-a radio feature list associated with the LTE RAN, the system parameters transmitted by the UE 115-a may also include an indication of whether the UE 115-a is capable of VoLTE. In such cases, the capability indication provided by the UE 115-a may include a number of separate VoPS capability bits, which may indicate, for example, that VoPS if supported for VoLTE-FDD and VoLTE-TDD. In cases where the first base station 105-a determines that a voice call is to be established with the UE 115-a, the UE 115-a capability for VoLTE may be used and the first base station 105-a may make an accurate decision on fallback without decoding UE LTE radio feature list.

In some cases, the first base station 105-a may establish a VoLTE call at the UE 115-a, and may determine that the connection with the UE 115-a is to be handed over to a different base station. In such cases, the first base station 105-a may be a source base station, and a target base station that is to receive the handover of the UE 115-a may be selected based on a single radio voice call continuity (SRVCC) capability of the UE 115-a that indicates capabilities for handover of a voice call from a packet switched domain to a circuit switched domain. In some cases, the system parameters provided by the UE 115-a may include LTE SRVCC capability bits, 3G (e.g., UTRA SRVCC) capability bits, 2G (e.g., GERAN SRVCC) capability bits, or any combinations thereof. The first base station 105-a may use such information to make an accurate decision on fallback without decoding UE 115-a capabilities for one or more different RANs.

In some cases, the UE 115-a capability indication may be provided with UE-NR capability information that is provided via radio resource control (RRC) signaling. For example, established UE-NR capability signaling may be modified such as indicated below to provide UE system-level parameter information that explicitly indicates VoPS capabilities of a UE. It is to be understood that the below examples are provided for purposes of discussion and illustration only, and that UE capabilities may be indicated using any of a number of different signaling schemes. For example:

```
UE-NR-Capability ::= SEQUENCE {
    pdcp-Parameters            PDCP-Parameters,
    rlc-Parameters             RLC-Parameters             OPTIONAL,
    mac-Parameters             MAC-Parameters             OPTIONAL,
    phy-Parameters             Phy-Parameters,
    rf-Parameters              RF-Parameters,
    measParameters             MeasParameters             OPTIONAL,
    fdd-Add-UE-NR-Capabilities UE-NR-CapabilityAddXDD-Mode OPTIONAL,
    tdd-Add-UE-NR-Capabilities UE-NR-CapabilityAddXDD-Mode OPTIONAL,
    fr1-Add-UE-NR-Capabilities UE-NR-CapabilityAddFRX-Mode OPTIONAL,
    fr2-Add-UE-NR-Capabilities UE-NR-CapabilityAddFRX-Mode OPTIONAL,
```

```
        system-Parameters               System-Parameters              OPTIONAL,
        lateNonCriticalExtension        OCTET STRING                   OPTIONAL,
        nonCriticalExtension            SEQUENCE { }                   OPTIONAL
}
System-Parameters ::= SEQUENCE {
    voiceOverPS-Capabilities            VoiceOverPS-Capabilities       OPTIONAL,
    ...
}
VoiceOverPS-Capabilities   ::= SEQUENCE {
    vonr-FDD                            ENUMERATED {supported}         OPTIONAL,
    vonr-TDD                            ENUMERATED {supported}         OPTIONAL,
    vonr-FR2                            ENUMERATED {supported}         OPTIONAL,
    volte-FDD                           ENUMERATED {supported}         OPTIONAL,
    volte-TDD                           ENUMERATED {supported}         OPTIONAL,
    srvcc-FromEUTRA-FDD-ToUTRA-FDD          ENUMERATED {supported} OPTIONAL,
    srvcc-FromEUTRA-FDD-ToGERAN             ENUMERATED {supported} OPTIONAL,
    srvcc-FromEUTRA-TDD-ToUTRA-FDD          ENUMERATED {supported} OPTIONAL,
    srvcc-FromEUTRA-TDD-ToGERAN             ENUMERATED {supported} OPTIONAL,
    srvcc-FromNR-FDD-ToUTRA-FDD             ENUMERATED {supported} OPTIONAL,
    srvcc-FromNR-TDD-ToUTRA-FDD             ENUMERATED {supported} OPTIONAL,
    srvcc-FromNR-FDD-ToGERAN                ENUMERATED {supported} OPTIONAL,
    srvcc-FromNR-TDD-ToGERAN                ENUMERATED {supported} OPTIONAL,
    ...
}.
```

In some cases, as indicated above, the UE 115-a may be handed over from the first base station 105-a to a different base station following the establishment of a voice call. In such cases, it may be beneficial to handover the UE 115-a to a target base station that provide voice call services that are supported by the UE 115-a.

Figure 3:
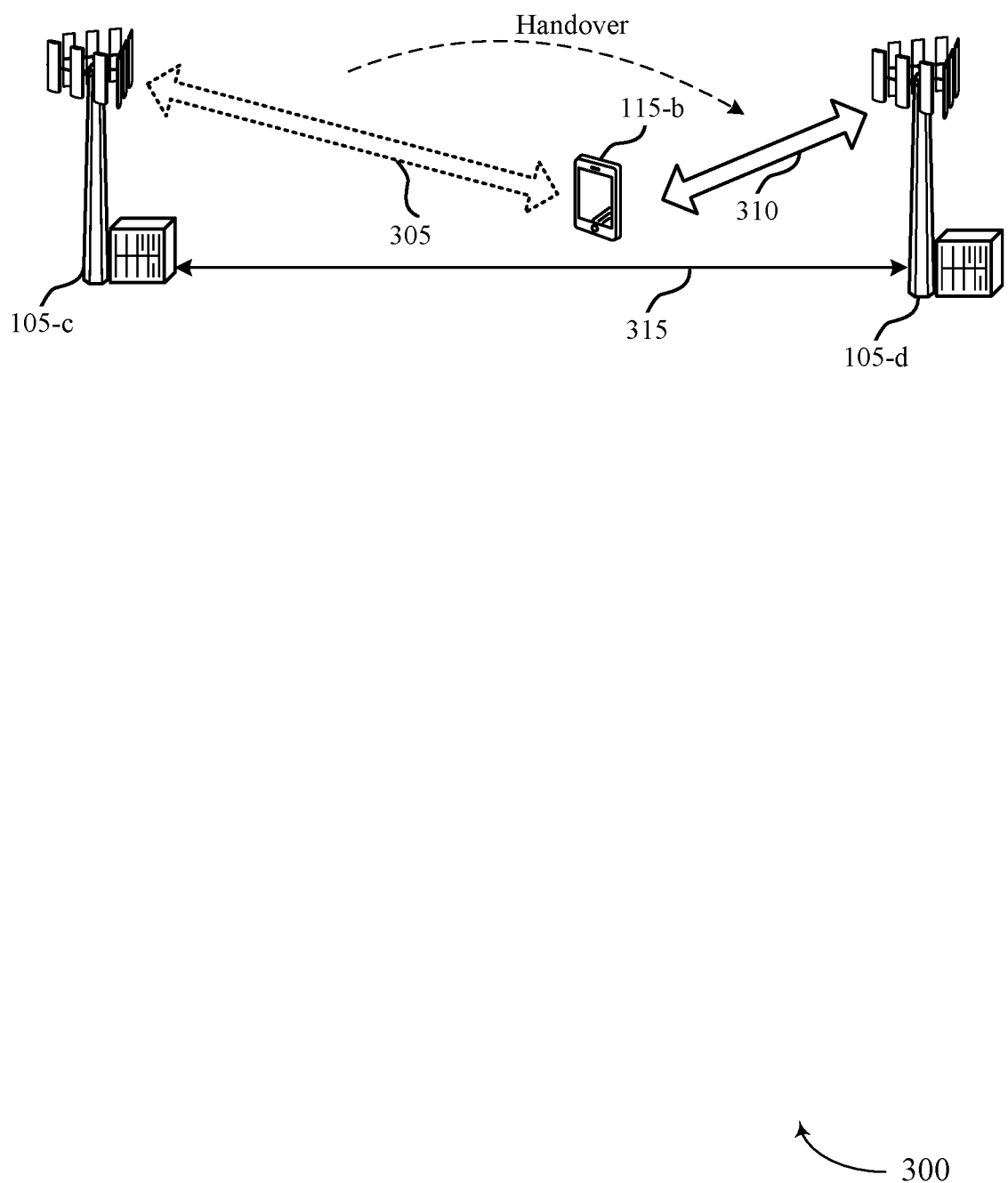
FIG. 3 illustrates an example of a handover between wireless communications systems that supports packet switched voice call capability indication in wireless communications in accordance with aspects of the present disclosure.

FIG. 3 illustrates an example of a handover between wireless communications systems 300 that supports packet switched voice call capability indication in wireless communications in accordance with aspects of the present disclosure. In some examples, handover between wireless communications systems 300 may implement aspects of wireless communications system 100 or 200. Wireless communications system 300 may include a first base station 105-c that operates in a 5G or NR RAN, a second base station 105-d that operates in a different RAN (e.g., a 4G or LTE RAN, a 3G RAN, or a 2G RAN), and a UE 115-b that may be handed over from the first base station 105-c to the second base station 105-d. The first base station 105-c and the second base station 105-d may be connected via backhaul link 315 and may exchange handover information, and other information, via the backhaul link 315. The first base station 105-c may be a source base station, and the second base station 105-d may be a target base station in a handover procedure. The UE 115-a may initially have an established first connection 305 with the first base station 105-c according to NR connection establishment techniques. The first base station 105-c and the second base station 105-d may exchange handover messages via backhaul link 315, and the first base station 105-c may transmit a handover command to the UE 115-b. Upon receipt of the handover command, the UE 115-b may establish a second connection 310 with the target base station 105-d. In some cases, one or more system parameters, such as discussed above with respect to FIG. 2, may be used by the first base station 105-c when selecting the second base station 105-d as the target of the handover procedure.

In some cases, the first connection 305 may be an LTE connection and the first base station 105-c may operate in an LTE RAN. In such cases, a VoLTE voice call may be established for the UE 115-b, that may be handed over from LTE to NR. To make the handover decision, first base station 105-c (i.e., the source base station) may need to know the UE 115-b VoPS capability of target RAN of the second base station 105-d (e.g., a NR RAN). To avoid the first base station 105-c having to decode NR radio capability, in some cases, the UE 115-b may provide an indication of VoNR capability that is added into UE capability information for an LTE connection. In one example, UE capability may be provided for LTE connections by providing one or more parameters as listed below:

```
IRAT-ParametersNR-r15 ::=           SEQUENCE {
    en-DC-r15                       ENUMERATED {supported}         OPTIONAL,
    supportedBandListNR-r15         SupportedBandListNR-r15        OPTIONAL,
    voiceOverNR-Capabilities-r15    VoiceOverNR-Capabilities-r15   OPTIONAL
}
VoiceOverNR-Capabilities-r15        ::= SEQUENCE {
    vonr-FDD-r15                    ENUMERATED {supported}         OPTIONAL,
    vonr-TDD-r15                    ENUMERATED {supported}         OPTIONAL,
    vonr-FR2-r15                    ENUMERATED {supported}         OPTIONAL,
    ...
}
```

An LTE base station in such cases may use the UE 115-b capability information to identify the target of the handover procedure. In some cases, one or more target base station candidate for a handover of the UE 115-c may have different support for VoPS voice calls. For example, as discussed above, an operator of an NR system may not support VoNR calls, or may not have completed testing and optimizations of the network sufficient to support reliable VoPS voice calls. A source base station may thus need to be aware of target base station capabilities. In intra-vendor handovers, a source node may be aware of this information based on operations and management (OAM) information. However, inter-vendor interworking by OAM may not be possible. In some cases, a source base station may be manually configured such that in a coverage border between different vendors, the VoPS capability of neighbor cells is manually configured and the source base station may select target base stations accordingly.

In other cases, a source base station may identify capabilities of adjacent base stations based on failures in handover attempts for different types of services, and failures of VoPS voice call handovers. Then, in future handovers, the base station associated with the failed attempts may not be selected as a target base station.

In some cases, the source base station 105-c may be configured with a handover restriction list, and base stations that do not support VoPS may be included in a restriction list such that the source base station 105-c does not select such a base station as a target. In some cases, voice call capability is uniform across a tracking area (TA), and the core network (e.g., a mobility management entity (MME) in the core network) may be aware of which TAs support VoPS and which do not. In some cases, such information may be included in a handover restriction list. For example, for LTE, a "Forbid VoPS TAs" may be added into an LTE Handover Restriction List, and for NR a "Forbid VoPS TAs" may be added into a NR Mobility Restriction List. In such a manner, handovers may be completed with reduced interruption of voice calls through the selection of targets based on the restriction list.

Figure 4:
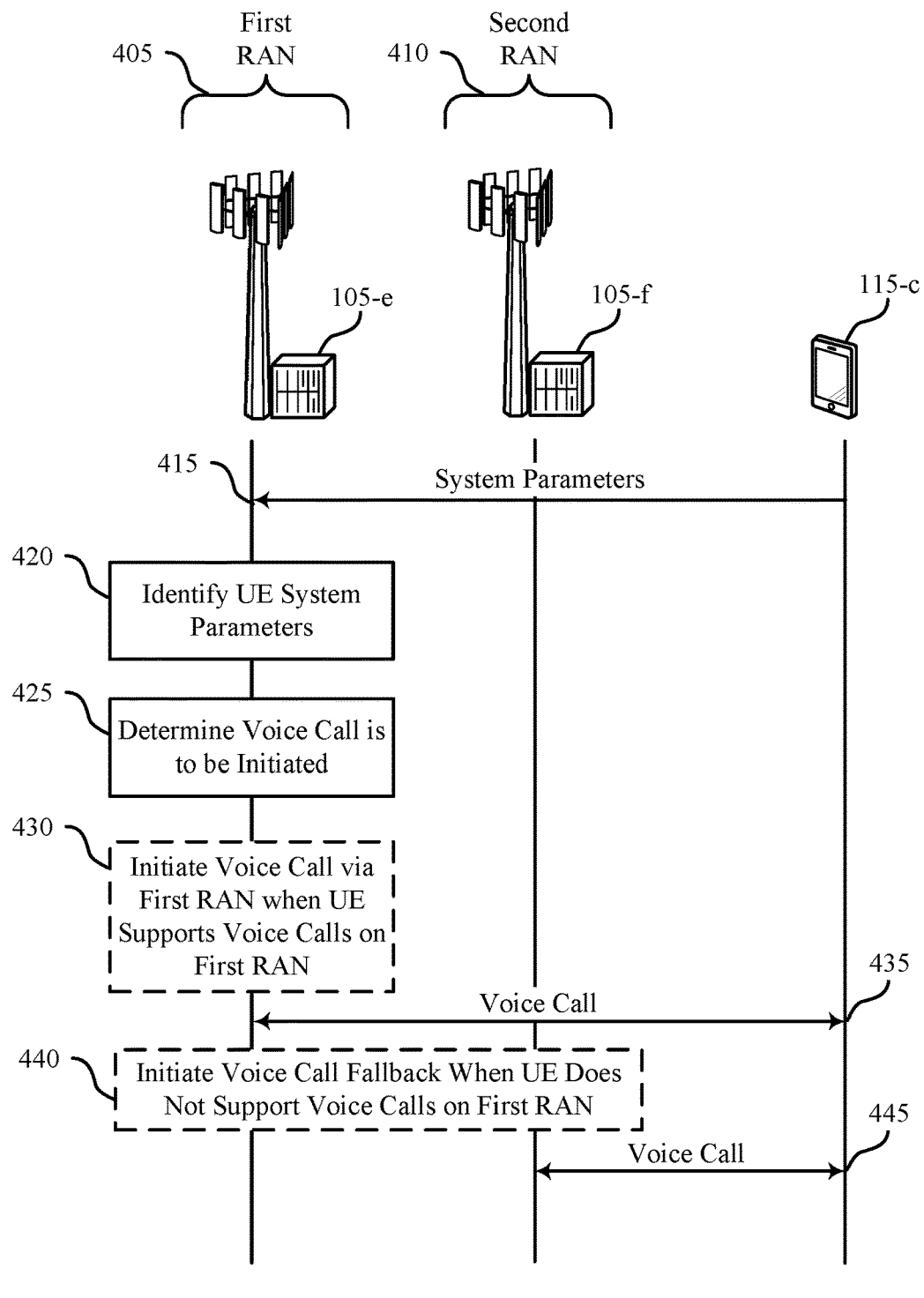
FIG. 4 illustrates an example of a process flow that supports packet switched voice call capability indication in wireless communications in accordance with aspects of the present disclosure.

FIG. 4 illustrates an example of a process flow 400 that supports packet switched voice call capability indication in wireless communications in accordance with aspects of the present disclosure. In some examples, process flow 400 may implement aspects of wireless communications system 100, 200, or 300. Process flow 400 may include a first base station 105-e which is part of a first RAN 405, a second base station 105-f which is part of a second RAN 410, and a UE 115-c. Each of these devices may be examples of the corresponding devices described with reference to FIG. 1-3. The first base station 105-e may operate in a NR RAN, and the second base station 105-f may operate in an LTE RAN, or a 3G or 2G RAN.

The UE 115-c may, in this example, transmit system parameters 415 to the first base station 105-e as part of a connection establishment. In some cases, the connection establishment may be initiated by a random access request, and RRC messaging may be exchanged to complete the connection establishment. In some cases, the system parameters 415 may be transmitted to the first base station 105-e as part of the RRC signaling. In other cases, the system parameters 415 may be transmitted to the first base station 105-e in other signaling or separately from the connection establishment signaling (e.g., in response to a capability query of the first base station 105-e transmitted following the establishment of a connection between the first base station 105-e and the UE 115-c).

At 420, the first base station 105-e may identify UE system parameters. In some cases, the UE system parameters may be VoPS related parameters that indicate the capability of the UE 115-c to support VoPS voice calls. In some cases, the VoPS parameters may indicate whether the UE 115-c supports some or all of TDD VoPS, FDD VoPS, FR2 VoPS, LTE VoPS, or NR VoPS.

At 425, the first base station 105-e may determine that a voice call is to be initiated with the UE 115-c. In some cases, such a determination may be made based on an indication from the core network that a voice call is to be established for the UE 115-c.

The first base station 105-e may then, based on the UE system parameters, determine whether the voice call can be established via the first RAN or that fallback to the second RAN is to be used to establish the voice call.

Optionally, at 430, in cases where the UE system parameters indicate that the UE 115-c can support VoPS via the first RAN, the first base station 105-e may initiate the voice call via the first RAN, to establish voice call 435 with the UE 115-c. Alternatively, at 440, in cases where the UE system parameters indicate that the UE 115-c does not support VoPS via the first RAN, the first base station may initiate voice call fallback, and voice call 445 may be established for the UE 115-c via the second base station 105-f. In some cases, voice call fallback may be initiated by tunneling voice call information to the second base station 105-f that may be used by the second base station 105-f to establish the voice call 445. In some cases, the second base station 105-f may receive (e.g., via signaling from the first base station 105-e, or from an MME), an indication of the voice call and may page the UE 115-c to establish the voice call 445. In any event, the first base station 105-e is able to unambiguously facilitate the establishment of a voice call with the UE 115-c in accordance with the UE 115-c capabilities.

Figure 5:
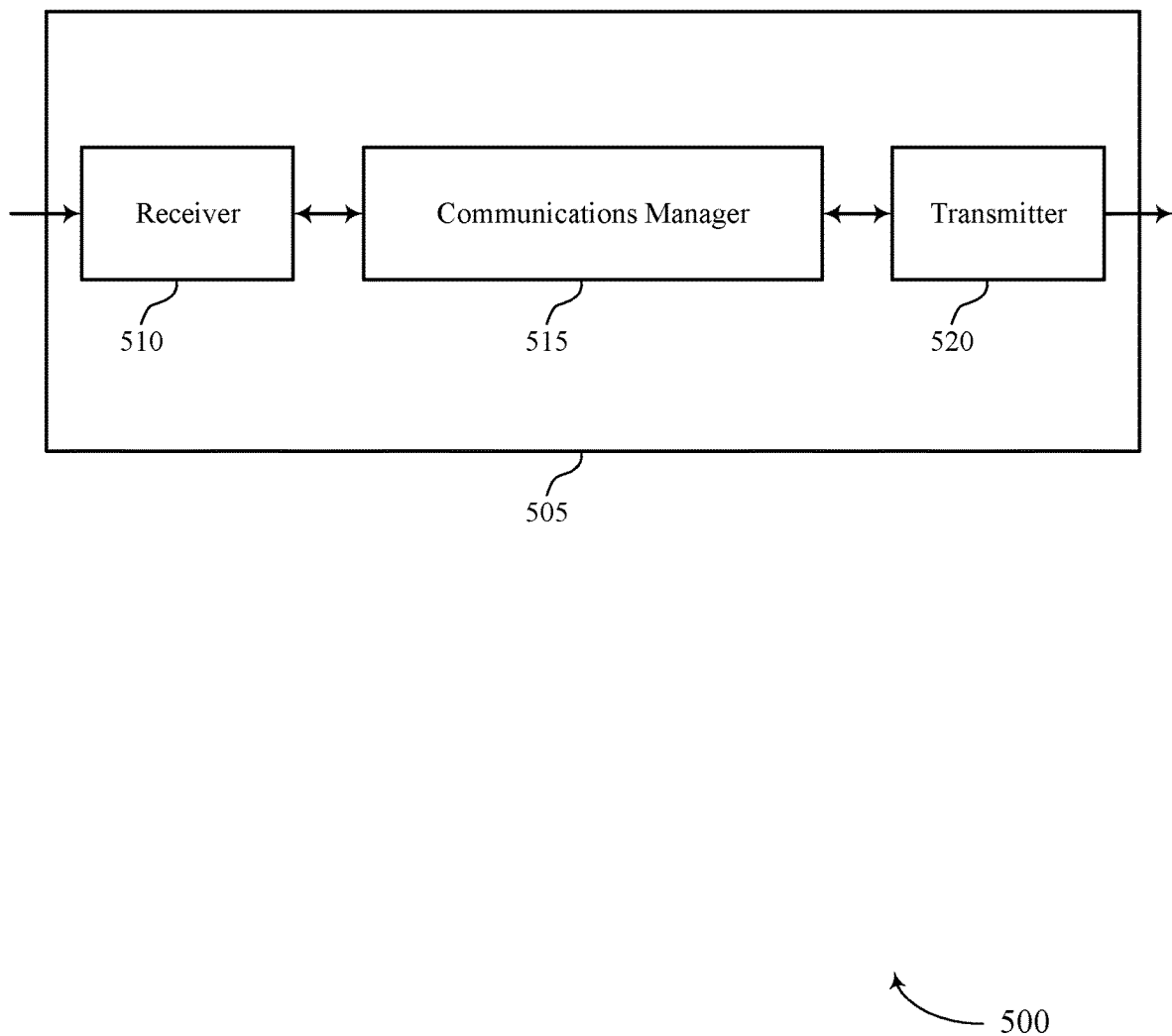
FIGS. 5 and 6 show block diagrams of devices that support packet switched voice call capability indication in wireless communications in accordance with aspects of the present disclosure.

FIG. 5 shows a block diagram 500 of a device 505 that supports packet switched voice call capability indication in wireless communications in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to packet switched voice call capability indication in wireless communications, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may initiate a connection establishment with a base station to establish a wireless connection using a first radio access network (RAN), establish the connection with the base station using the first RAN based on the system-level parameter, and transmit, to the base station, a system-level parameter that indicates whether the UE has a capability to support packet switched voice calls via the first RAN and one or more capability bits for component features of packet switched voice calls. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
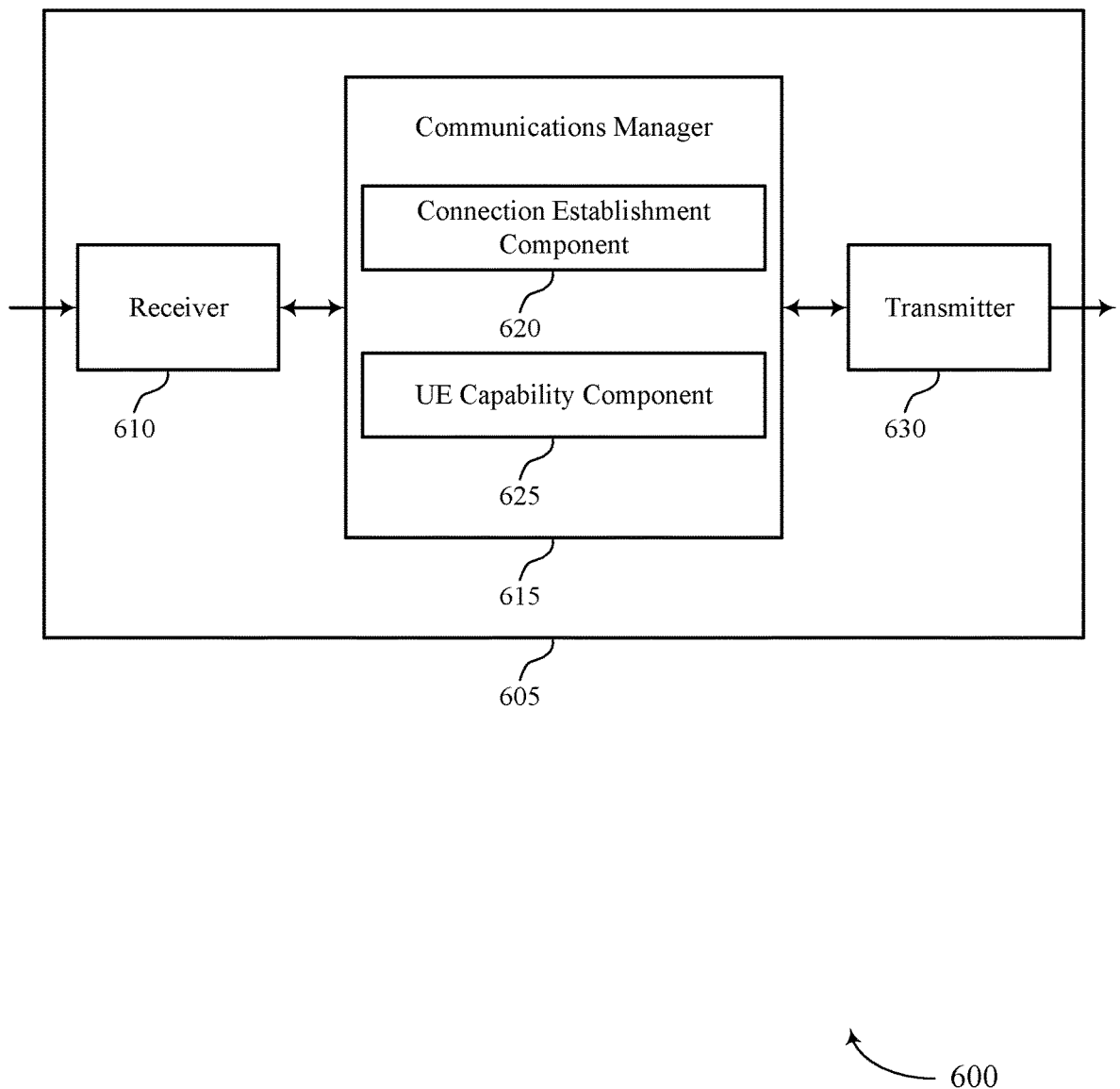

FIG. 6 shows a block diagram 600 of a device 605 that supports packet switched voice call capability indication in wireless communications in accordance with aspects of the present disclosure. The device 605 may be an example of aspects of a device 505 or a UE 115 as described herein. The device 605 may include a receiver 610, a communications manager 615, and a transmitter 630. The device 605 may also include a processor. Each of these components may be in communication with one another (e.g., via one or more buses).

The receiver 610 may receive information such as packets, user data, or control information associated with various information channels (e.g., control channels, data channels, and information related to packet switched voice call capability indication in wireless communications, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a connection establishment component 620 and a UE capability component 625. The communications manager 615 may be an example of aspects of the communications manager 810 described herein.

The connection establishment component 620 may initiate a connection establishment with a base station to establish a wireless connection using a first radio access network (RAN) and establish the connection with the base station using the first RAN.

The UE capability component 625 may transmit, to the base station as part of the connection establishment or after connection establishment, a system-level parameter that indicates whether the UE has a capability to support packet switched voice calls via the first RAN and one or more capability bits for component features of packet switched voice calls.

The transmitter 630 may transmit signals generated by other components of the device 605. In some examples, the transmitter 630 may be collocated with a receiver 610 in a transceiver module. For example, the transmitter 630 may be an example of aspects of the transceiver 820 described with reference to FIG. 8. The transmitter 630 may utilize a single antenna or a set of antennas.

Figure 7:
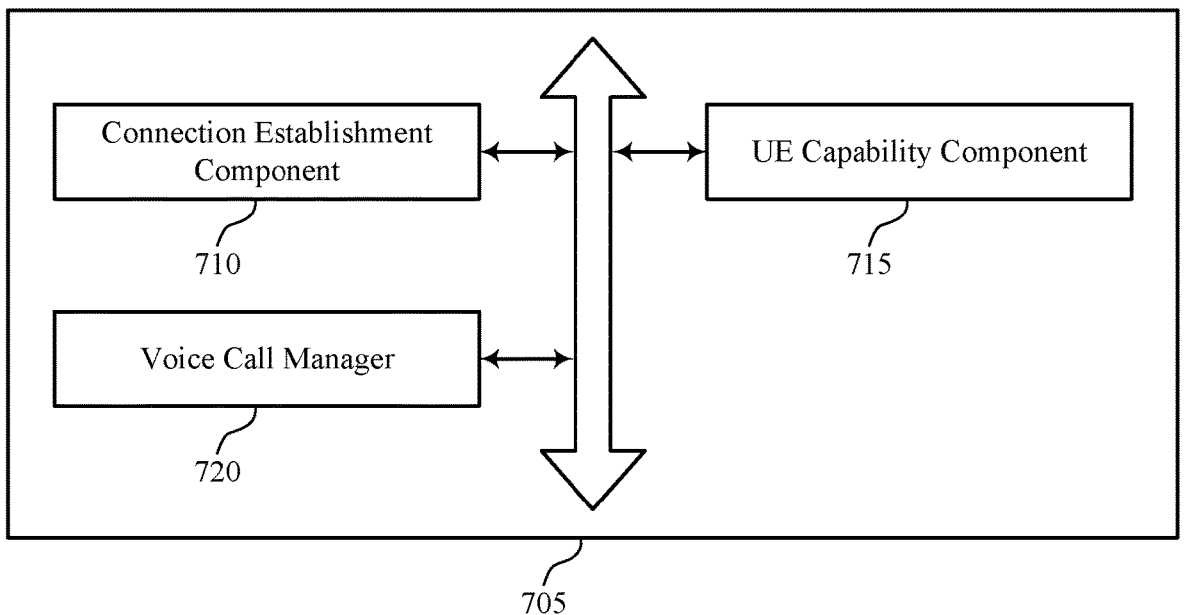
FIG. 7 shows a block diagram of a communications manager that supports packet switched voice call capability indication in wireless communications in accordance with aspects of the present disclosure.

FIG. 7 shows a block diagram 700 of a communications manager 705 that supports packet switched voice call capability indication in wireless communications in accordance with aspects of the present disclosure. The communications manager 705 may be an example of aspects of a communications manager 515, a communications manager 615, or a communications manager 810 described herein. The communications manager 705 may include a connection establishment component 710, a UE capability component 715, and a voice call manager 720. Each of these modules may communicate, directly or indirectly, with one another (e.g., via one or more buses).

The connection establishment component 710 may initiate a connection establishment with a base station to establish a wireless connection using a first radio access network (RAN). In some examples, the connection establishment component 710 may establish the connection with the base station using the first RAN based on the system-level parameter.

In some examples, the connection establishment component 710 may initiate a second connection establishment with a second base station to establish a second wireless connection using a second RAN. In some examples, the connection establishment component 710 may transmit, to the second base station as part of the second connection establishment, a second system-level parameter that indicates whether the UE has the capability to support packet switched voice calls via the first RAN.

The UE capability component 715 may transmit, to the base station as part of the connection establishment or after connection establishment, a system-level parameter that indicates whether the UE has a capability to support packet switched voice calls via the first RAN and one or more capability bits for component features of packet switched voice calls. In some examples, the UE capability component 715 may transmit a set of capability bits indicate vertical capabilities that involve two or more protocol layers. In some examples, the UE capability component 715 may transmit a capability bit that indicates UE capability to support packet switched voice calls via TDD using the first RAN, and a capability bit that indicates UE capability to support packet switched voice calls via transmissions in a higher frequency range (e.g., FR2) using the first RAN (e.g., frequencies at 6 GHz or higher).

In some examples, the UE capability component 715 may transmit an indication of a second capability of the UE to support packet switched voice calls via a second RAN. In some cases, the system-level parameter is a first system parameter that indicates UE capability to support packet switched voice calls via FDD using the first RAN, and the indication of the second capability of the UE indicates UE capability for FDD for voice calls via the second RAN, TDD for voice calls via the second RAN, or combinations thereof. In some cases, the indication of the second capability of the UE indicates UE capability for single radio voice call continuity (SRVCC) to hand over a voice call from a packet switched domain to a circuit switched domain.

The voice call manager 720 may establish a voice call via the first RAN based on the system-level parameter indicating that the UE is capable to support packet switched voice calls via the first RAN. In some examples, the voice call manager 720 may establish a voice call via a second RAN based on the system-level parameter indicating that the UE lacks the capability to support packet switched voice calls via the first RAN. In some cases, the first RAN is a 5G or NR RAN, and the second RAN is a 4G, 3G, or 2G RAN.

Figure 8:
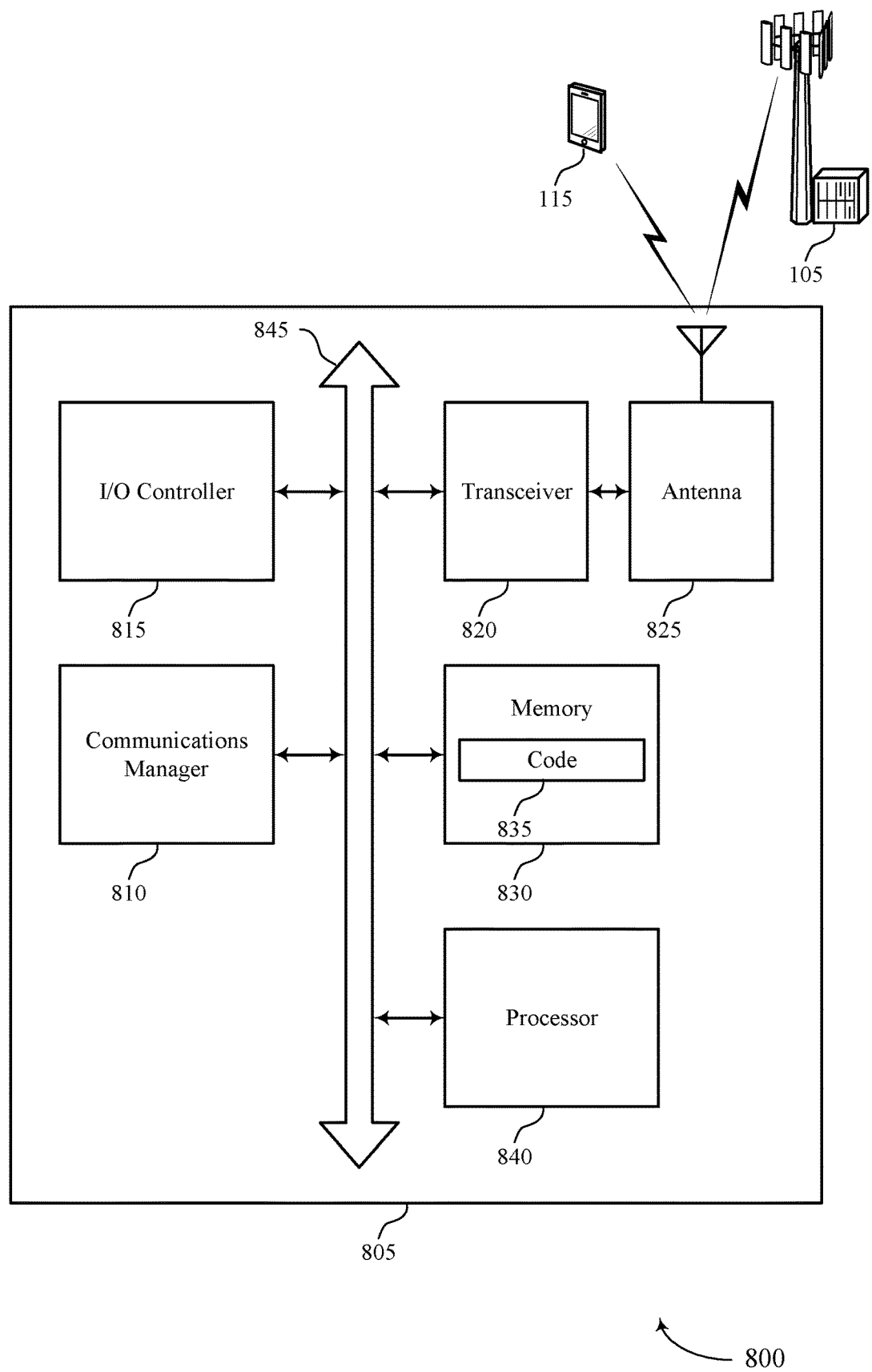
FIG. 8 shows a diagram of a system including a device that supports packet switched voice call capability indication in wireless communications in accordance with aspects of the present disclosure.

FIG. 8 shows a diagram of a system 800 including a device 805 that supports packet switched voice call capability indication in wireless communications in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may initiate a connection establishment with a base station to establish a wireless connection using a first radio access network (RAN), establish the connection with the base station using the first RAN based on the system-level parameter, and transmit, to the base station, a system-level parameter that indicates whether the UE has a capability to support packet switched voice calls via the first RAN.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting packet switched voice call capability indication in wireless communications).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
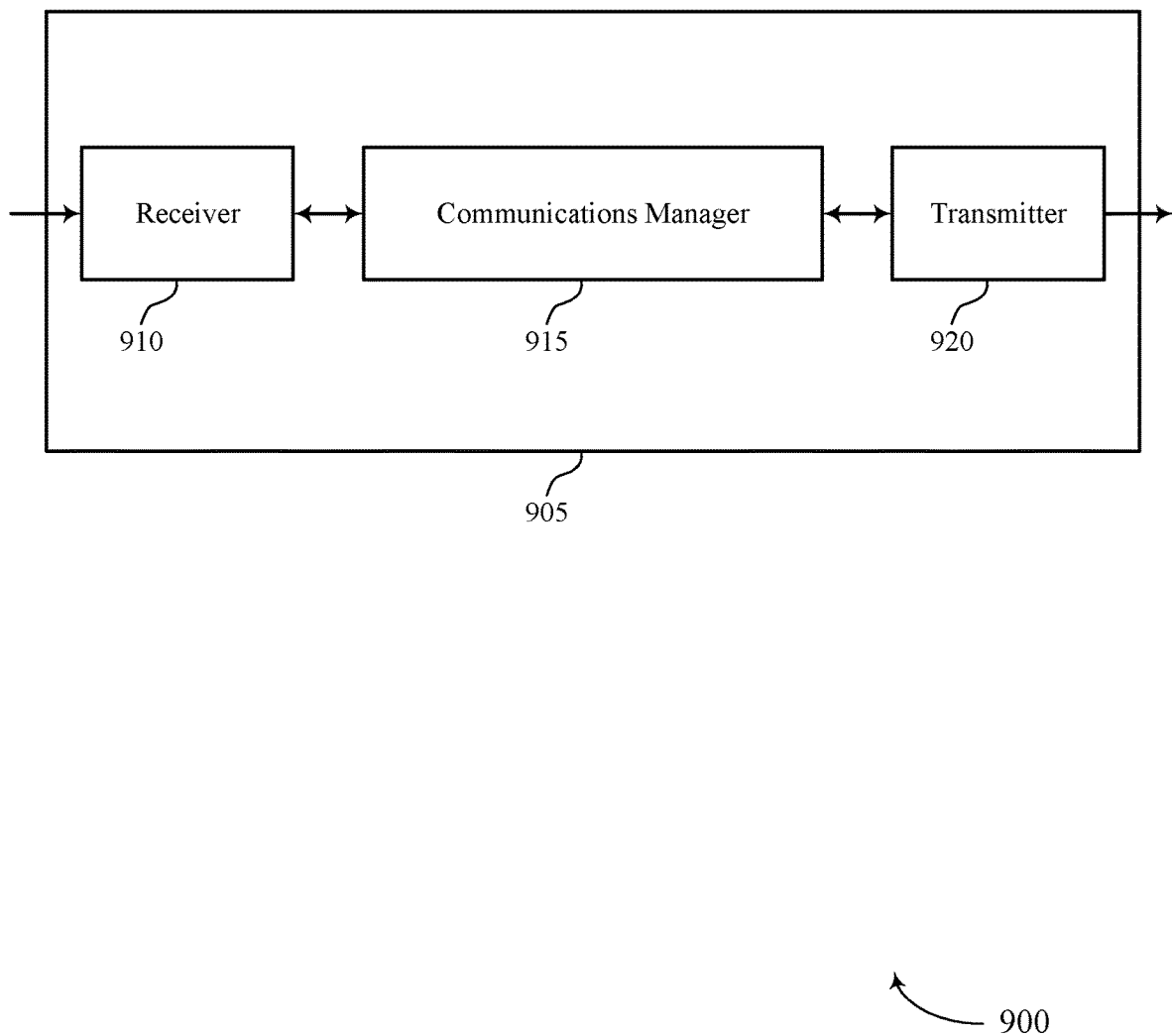
FIGS. 9 and 10 show block diagrams of devices that support packet switched voice call capability indication in wireless communications in accordance with aspects of the present disclosure.

FIG. 9 shows a block diagram 900 of a device 905 that supports packet switched voice call capability indication in wireless communications in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to packet switched voice call capability indication in wireless communications, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may initiate, at a base station in a first radio access network (RAN), a connection establishment with a UE, establish the connection with the UE based on the system-level parameter, and receive, from the UE, a system-level parameter that indicates whether the UE has a capability to support packet switched voice calls via the first RAN. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
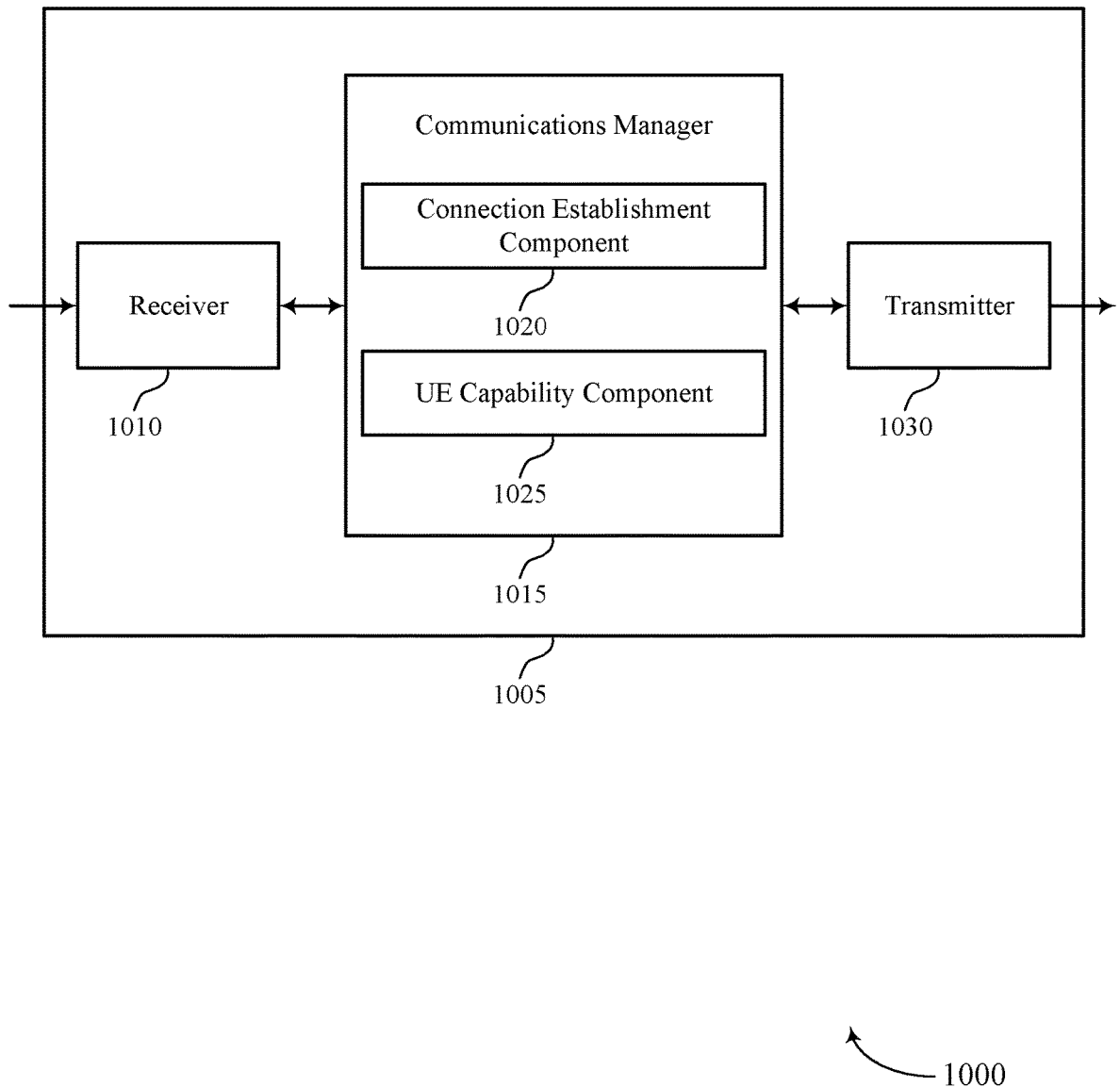

FIG. 10 shows a block diagram 1000 of a device 1005 that supports packet switched voice call capability indication in wireless communications in accordance with aspects of the present disclosure. The device 1005 may be an example of aspects of a device 905 or a base station 105 as described herein. The device 1005 may include a receiver 1010, a communications manager 1015, and a transmitter 1030. The device 1005 may also include a processor. Each of these components may be in communication with one another (e.g., via one or more buses).

The receiver 1010 may receive information such as packets, user data, or control information associated with various information channels (e.g., control channels, data channels, and information related to packet switched voice call capability indication in wireless communications, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a connection establishment component 1020 and a UE capability component 1025. The communications manager 1015 may be an example of aspects of the communications manager 1210 described herein.

The connection establishment component 1020 may initiate, at a base station in a first radio access network (RAN), a connection establishment with a UE and establish the connection with the UE based on the system-level parameter.

The UE capability component 1025 may receive, from the UE as part of the connection establishment of after connection establishment, a system-level parameter that indicates whether the UE has a capability to support packet switched voice calls via the first RAN.

The transmitter 1030 may transmit signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
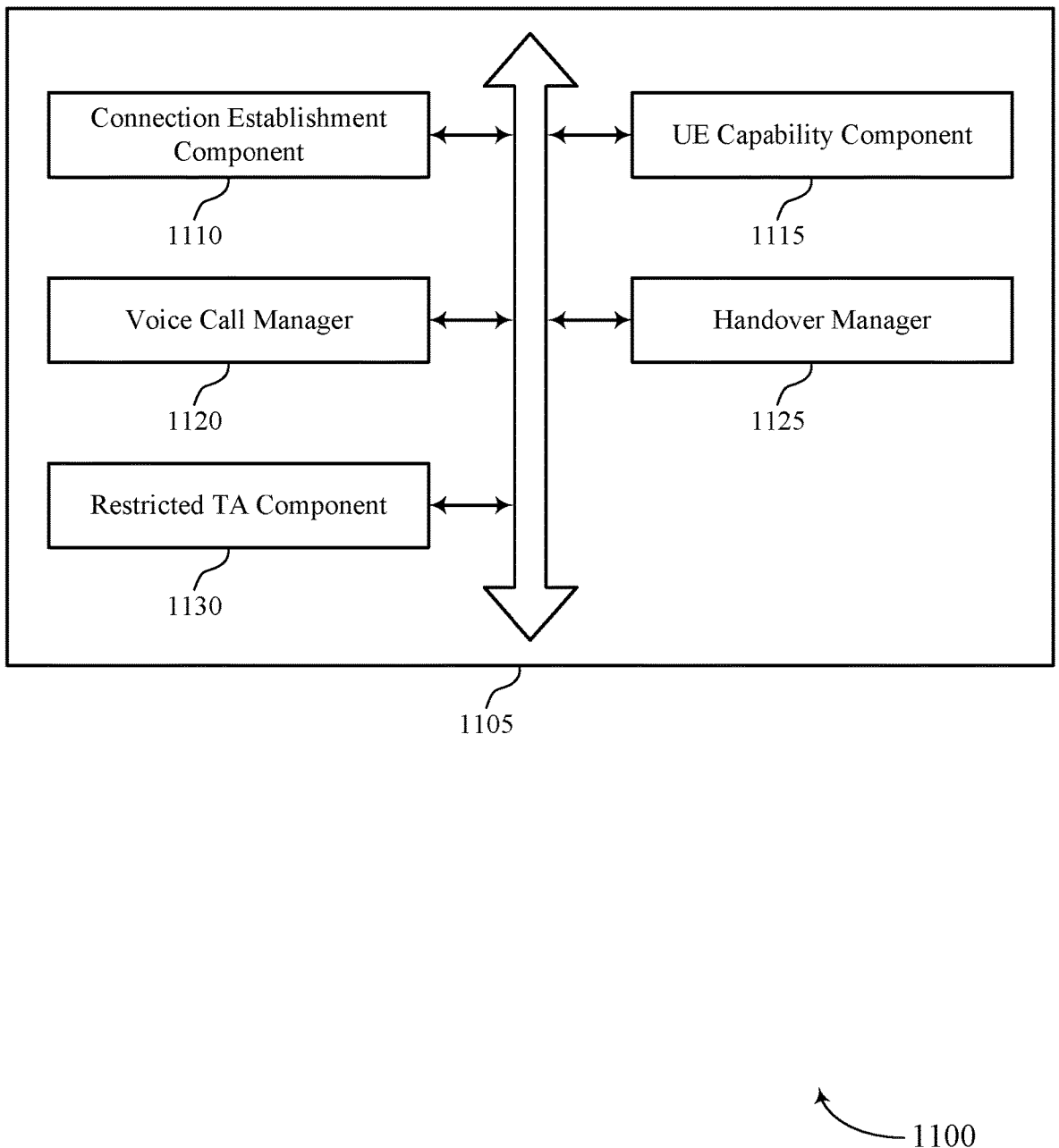
FIG. 11 shows a block diagram of a communications manager that supports packet switched voice call capability indication in wireless communications in accordance with aspects of the present disclosure.

FIG. 11 shows a block diagram 1100 of a communications manager 1105 that supports packet switched voice call capability indication in wireless communications in accordance with aspects of the present disclosure. The communications manager 1105 may be an example of aspects of a communications manager 915, a communications manager 1015, or a communications manager 1210 described herein. The communications manager 1105 may include a connection establishment component 1110, a UE capability component 1115, a voice call manager 1120, a handover manager 1125, and a restricted TA component 1130. Each of these modules may communicate, directly or indirectly, with one another (e.g., via one or more buses).

The connection establishment component 1110 may initiate, at a base station in a first radio access network (RAN), a connection establishment with a UE. In some examples, the connection establishment component 1110 may establish the connection with the UE based on the system-level parameter of the UE.

The UE capability component 1115 may receive, from the UE as part of the connection establishment or after connection establishment, a system-level parameter that indicates whether the UE has a capability to support packet switched voice calls via the first RAN. In some examples, the UE capability component 1115 may receive a set of capability bits for vertical capabilities of the UE that involve two or more protocol layers.

In some examples, the UE capability component 1115 may receive, from the UE, a capability bit that indicates UE capability to support packet switched voice calls via TDD using the first RAN, and a capability bit that indicates UE capability to support packet switched voice calls via transmissions in a higher frequency range (e.g., FR2) using the first RAN. In some examples, the UE capability component 1115 may receive an indication of a second capability of the UE to support packet switched voice calls via a second RAN. In some cases, the indication of the second capability of the UE indicates UE capability for FDD for voice calls via the second RAN, TDD for voice calls via the second RAN, or combinations thereof.

The voice call manager 1120 may establish a voice call for the UE via the first RAN based on the system-level parameter indicating that the UE is capable to support packet switched voice calls via the first RAN.

The handover manager 1125 may receive a request to initiate a voice call from the UE. In some examples, the handover manager 1125 may hand over the UE to a second base station of a second RAN to establish the voice call. In some examples, the handover manager 1125 may initiate a handover of the UE to a second base station of the second RAN based on the indication of the second capability of the UE. In some cases, the first RAN is a 5G or NR RAN, and the second RAN is a 4G, 3G, or 2G RAN. In some cases, the indication of the second capability of the UE indicates UE capability for single radio voice call continuity (SRVCC) to hand over a voice call from a packet switched domain to a circuit switched domain.

The restricted TA component 1130 may receive a list of other base stations that are restricted from establishing packet switched voice calls. In some examples, the restricted TA component 1130 may initiate a handover of the UE to a second base station for a voice call based on the list of other base stations that are restricted from establishing packet switched voice calls.

Figure 12:
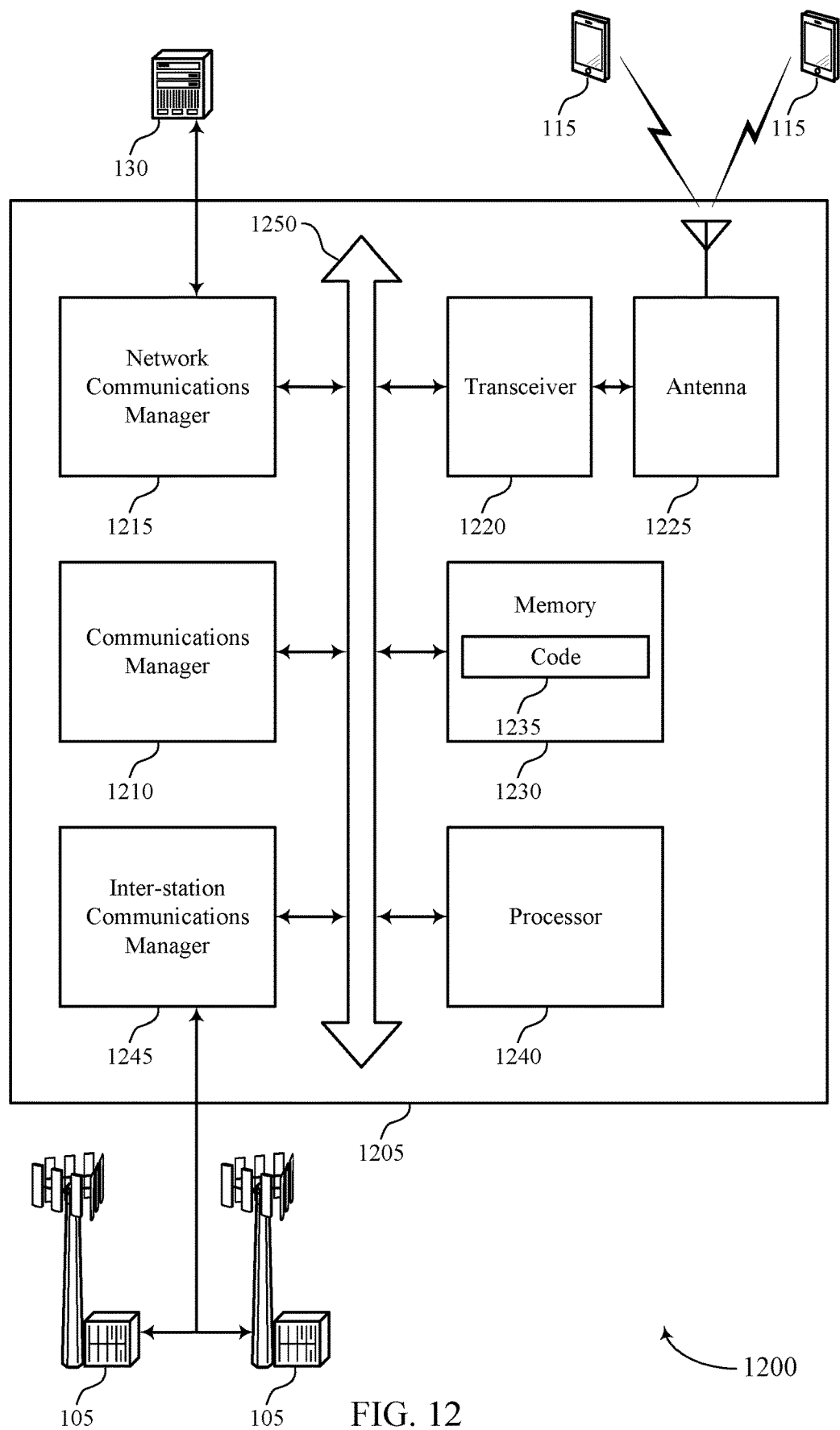
FIG. 12 shows a diagram of a system including a device that supports packet switched voice call capability indication in wireless communications in accordance with aspects of the present disclosure.

FIG. 12 shows a diagram of a system 1200 including a device 1205 that supports packet switched voice call capability indication in wireless communications in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may initiate, at a base station in a first radio access network (RAN), a connection establishment with a UE, establish the connection with the UE based on the system-level parameter, and receive, from the UE, a system-level parameter that indicates whether the UE has a capability to support packet switched voice calls via the first RAN.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting packet switched voice call capability indication in wireless communications).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
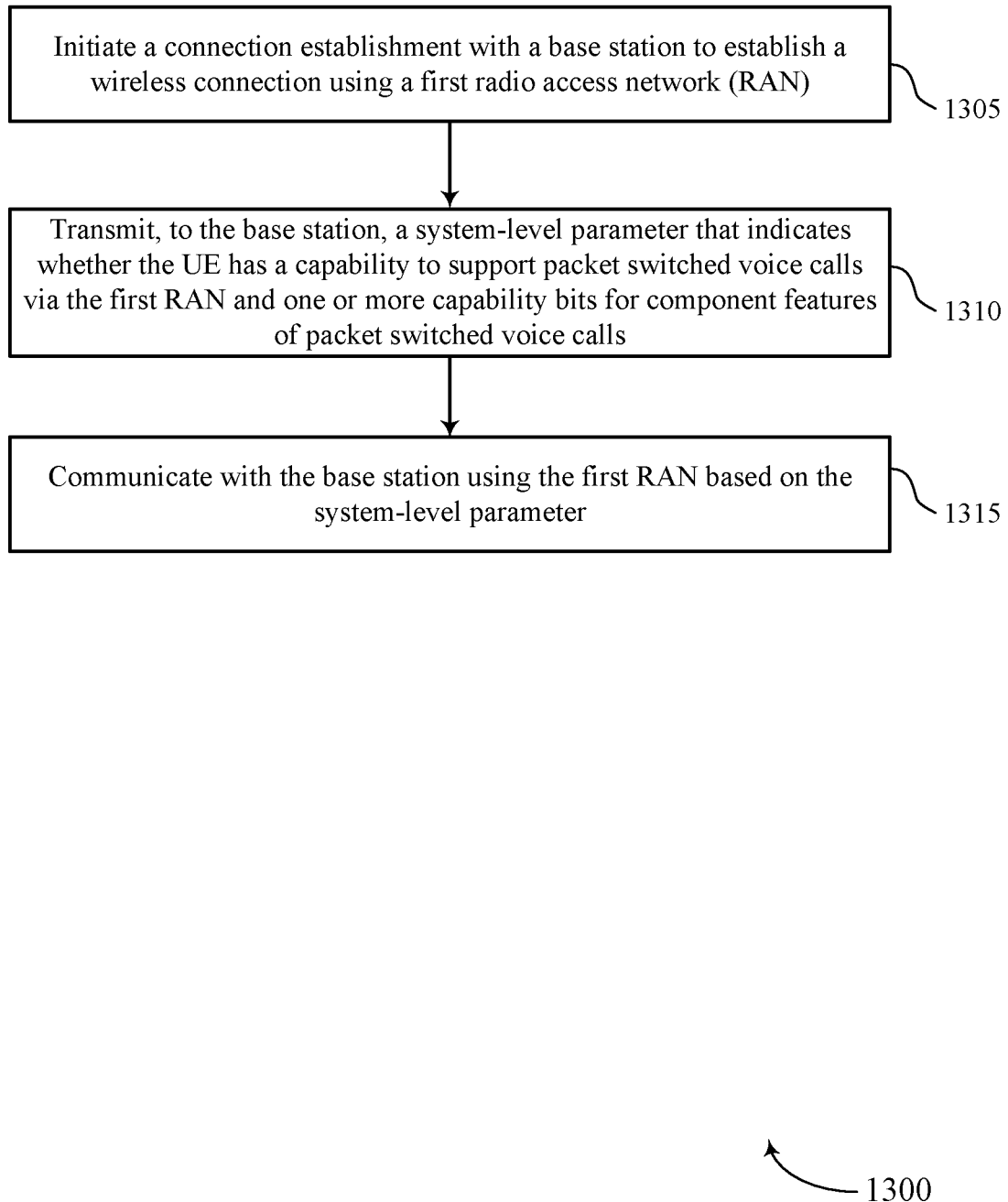
FIGS. 13 through 20 show flowcharts illustrating methods that support packet switched voice call capability indication in wireless communications in accordance with aspects of the present disclosure.

FIG. 13 shows a flowchart illustrating a method 1300 that supports packet switched voice call capability indication in wireless communications in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may initiate a connection establishment with a base station to establish a wireless connection using a first radio access network (RAN). The operations of 1305 may be performed according to the methods described herein. In some examples, aspects of the operations of 1305 may be performed by a connection establishment component as described with reference to FIGS. 5 through 8.

At 1310, the UE may transmit, to the base station, a system-level parameter that indicates whether the UE has a capability to support packet switched voice calls via the first RAN and one or more capability bits for component features of packet switched voice calls. The operations of 1310 may be performed according to the methods described herein. In some examples, aspects of the operations of 1310 may be performed by a UE capability component as described with reference to FIGS. 5 through 8. In some cases, the UE may transmit a set of capability bits for vertical capabilities that involve two or more protocol layers. In some cases, the capability bits include a first capability bit that indicates UE capability to support packet switched voice calls via FDD using the first RAN, a second capability bit that indicates UE capability to support packet switched voice calls via TDD using the first RAN, and a third capability bit that indicates UE capability to support packet switched voice calls via transmissions in a higher frequency range (e.g., FR2) using the first RAN.

In some cases, the UE may transmit an indication of a second capability of the UE to support packet switched voice calls via a second RAN. In some cases, the indication of the second capability of the UE indicates UE capability for FDD for voice calls via the second RAN, TDD for voice calls via the second RAN, or combinations thereof. In some cases, the indication of the second capability of the UE indicates UE capability for single radio voice call continuity (SRVCC) to hand over a voice call from a packet switched domain to a circuit switched domain.

At 1315, the UE may communicate with the base station using the first RAN based on the system-level parameter. The operations of 1315 may be performed according to the methods described herein. In some examples, aspects of the operations of 1315 may be performed by a connection establishment component as described with reference to FIGS. 5 through 8.

Figure 14:
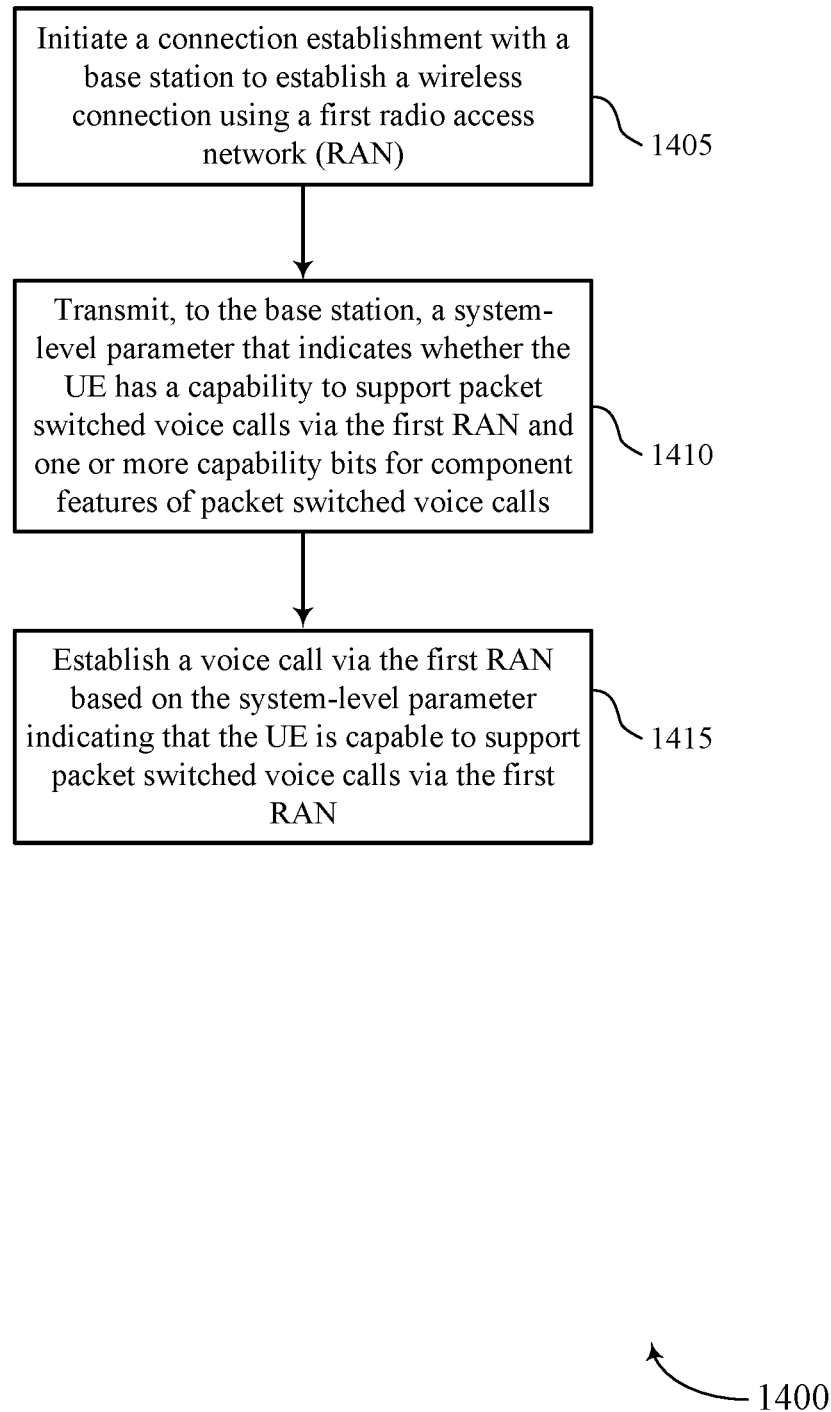

FIG. 14 shows a flowchart illustrating a method 1400 that supports packet switched voice call capability indication in wireless communications in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may initiate a connection establishment with a base station to establish a wireless connection using a first radio access network (RAN). The operations of 1405 may be performed according to the methods described herein. In some examples, aspects of the operations of 1405 may be performed by a connection establishment component as described with reference to FIGS. 5 through 8.

At 1410, the UE may transmit, to the base station, a system-level parameter that indicates whether the UE has a capability to support packet switched voice calls via the first RAN and one or more capability bits for component features of packet switched voice calls. The operations of 1410 may be performed according to the methods described herein. In some examples, aspects of the operations of 1410 may be performed by a UE capability component as described with reference to FIGS. 5 through 8.

At 1415, the UE may establish a voice call via the first RAN based on the system-level parameter indicating that the UE is capable to support packet switched voice calls via the first RAN. The operations of 1415 may be performed according to the methods described herein. In some examples, aspects of the operations of 1415 may be performed by a voice call manager as described with reference to FIGS. 5 through 8.

Figure 15:
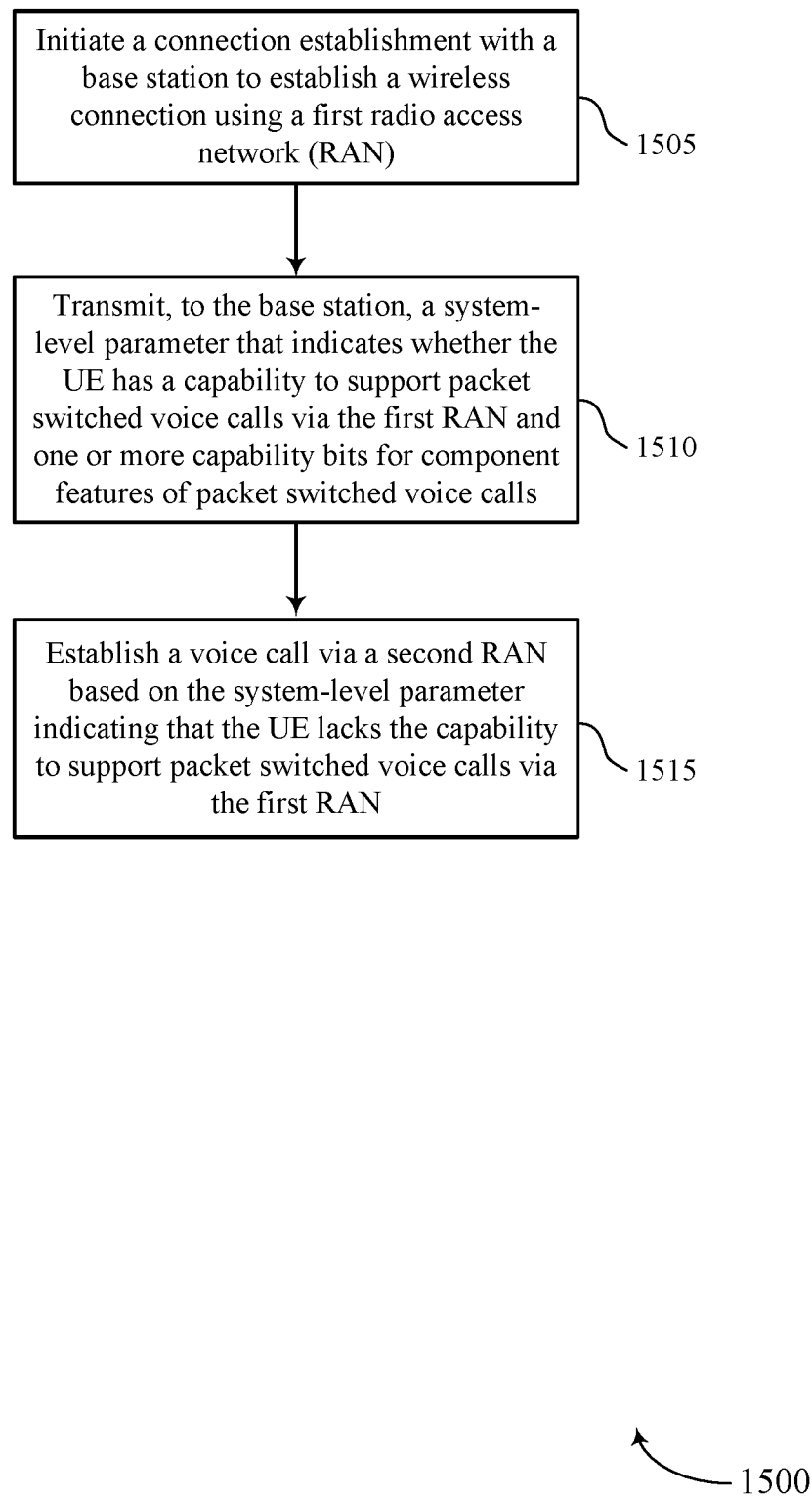

FIG. 15 shows a flowchart illustrating a method 1500 that supports packet switched voice call capability indication in wireless communications in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may initiate a connection establishment with a base station to establish a wireless connection using a first radio access network (RAN). The operations of 1505 may be performed according to the methods described herein. In some examples, aspects of the operations of 1505 may be performed by a connection establishment component as described with reference to FIGS. 5 through 8.

At 1510, the UE may transmit, to the base station, a system-level parameter that indicates whether the UE has a capability to support packet switched voice calls via the first RAN and one or more capability bits for component features of packet switched voice calls. The operations of 1510 may be performed according to the methods described herein. In some examples, aspects of the operations of 1510 may be performed by a UE capability component as described with reference to FIGS. 5 through 8.

At 1515, the UE may establish a voice call via a second RAN based on the system-level parameter indicating that the UE lacks the capability to support packet switched voice calls via the first RAN. The operations of 1515 may be performed according to the methods described herein. In some examples, aspects of the operations of 1515 may be performed by a voice call manager as described with reference to FIGS. 5 through 8. In some cases, the first RAN is a 5G or NR RAN, and the second RAN is a 4G, 3G, or 2G RAN.

Figure 16:
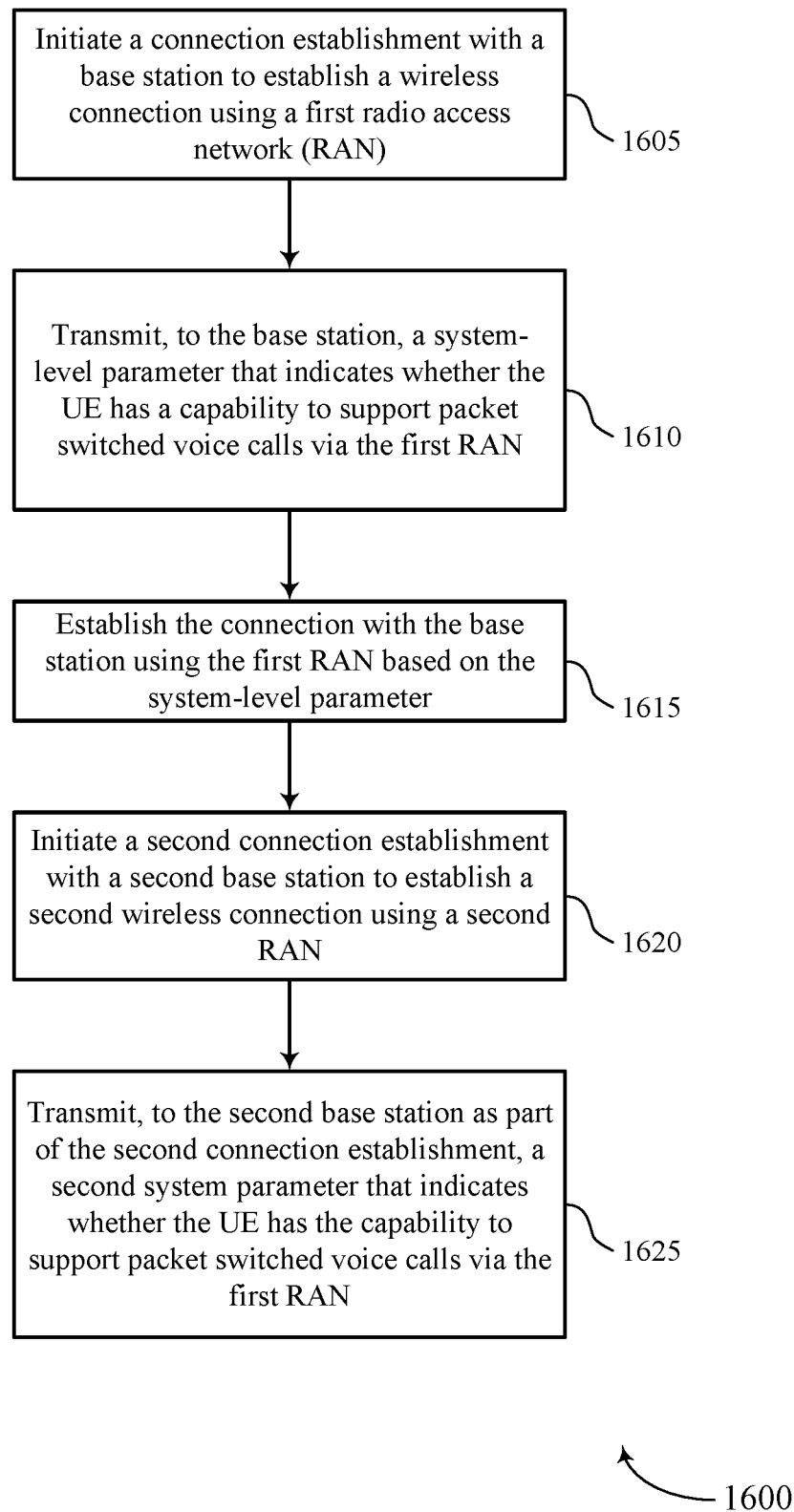

FIG. 16 shows a flowchart illustrating a method 1600 that supports packet switched voice call capability indication in wireless communications in accordance with aspects of the present disclosure. The operations of method 1600 may be implemented by a UE 115 or its components as described herein. For example, the operations of method 1600 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1605, the UE may initiate a connection establishment with a base station to establish a wireless connection using a first radio access network (RAN). The operations of 1605 may be performed according to the methods described herein. In some examples, aspects of the operations of 1605 may be performed by a connection establishment component as described with reference to FIGS. 5 through 8.

At 1610, the UE may transmit, to the base station, a system-level parameter that indicates whether the UE has a capability to support packet switched voice calls via the first RAN and one or more capability bits for component features of packet switched voice calls. The operations of 1610 may be performed according to the methods described herein. In some examples, aspects of the operations of 1610 may be performed by a UE capability component as described with reference to FIGS. 5 through 8.

At 1615, the UE may establish the connection with the base station using the first RAN based on the system-level parameter. The operations of 1615 may be performed according to the methods described herein. In some examples, aspects of the operations of 1615 may be performed by a connection establishment component as described with reference to FIGS. 5 through 8.

At 1620, the UE may initiate a second connection establishment with a second base station to establish a second wireless connection using a second RAN. The operations of 1620 may be performed according to the methods described herein. In some examples, aspects of the operations of 1620 may be performed by a connection establishment component as described with reference to FIGS. 5 through 8.

At 1625, the UE may transmit, to the second base station as part of the second connection establishment, a second system parameter that indicates whether the UE has the capability to support packet switched voice calls via the first RAN. The operations of 1625 may be performed according to the methods described herein. In some examples, aspects of the operations of 1625 may be performed by a connection establishment component as described with reference to FIGS. 5 through 8.

Figure 17:
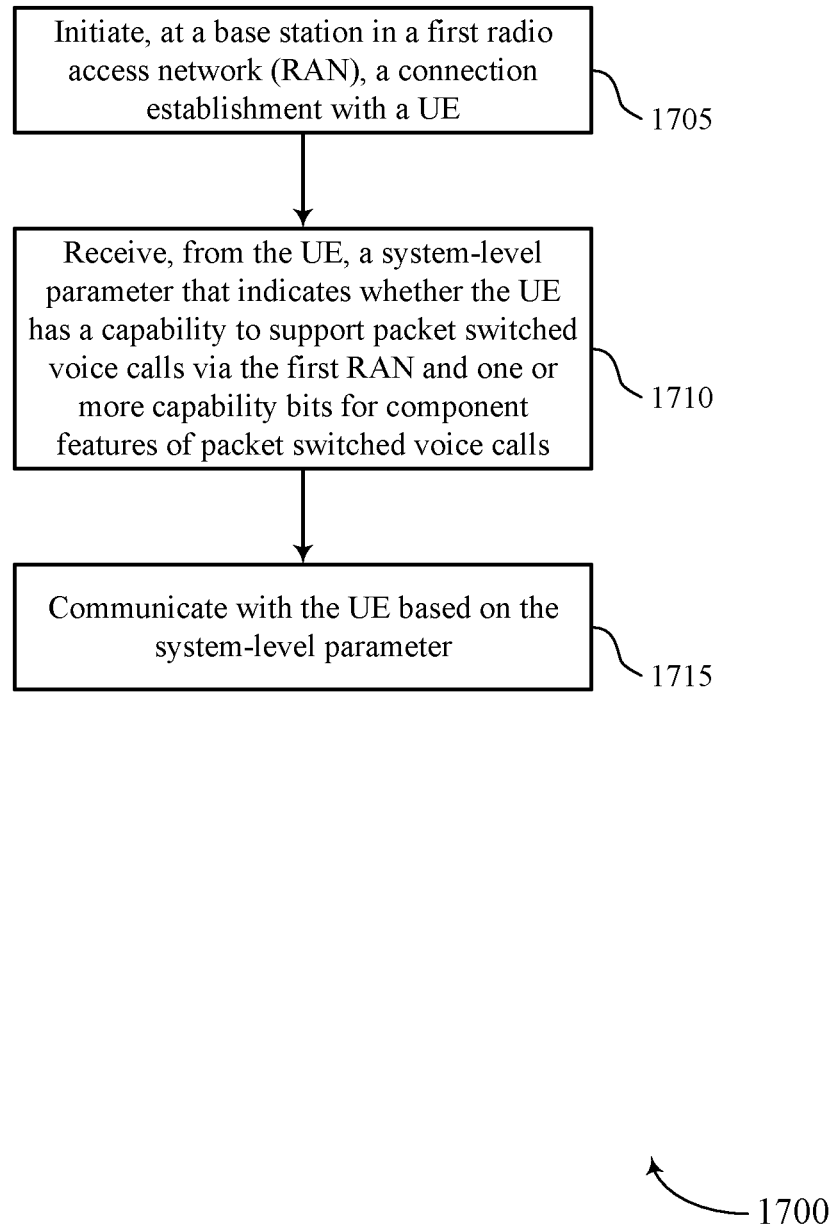

FIG. 17 shows a flowchart illustrating a method 1700 that supports packet switched voice call capability indication in wireless communications in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station in a first RAN may initiate a connection establishment with a UE. The operations of 1705 may be performed according to the methods described herein. In some examples, aspects of the operations of 1705 may be performed by a connection establishment component as described with reference to FIGS. 9 through 12.

At 1710, the base station may receive, from the UE, a system-level parameter that indicates whether the UE has a capability to support packet switched voice calls via the first RAN and one or more capability bits for component features of packet switched voice calls. The operations of 1710 may be performed according to the methods described herein. In some examples, aspects of the operations of 1710 may be performed by a UE capability component as described with reference to FIGS. 9 through 12.

At 1715, the base station may communicate with the UE based on the system-level parameter. The operations of 1715 may be performed according to the methods described herein. In some examples, aspects of the operations of 1715 may be performed by a connection establishment component as described with reference to FIGS. 9 through 12.

Figure 18:
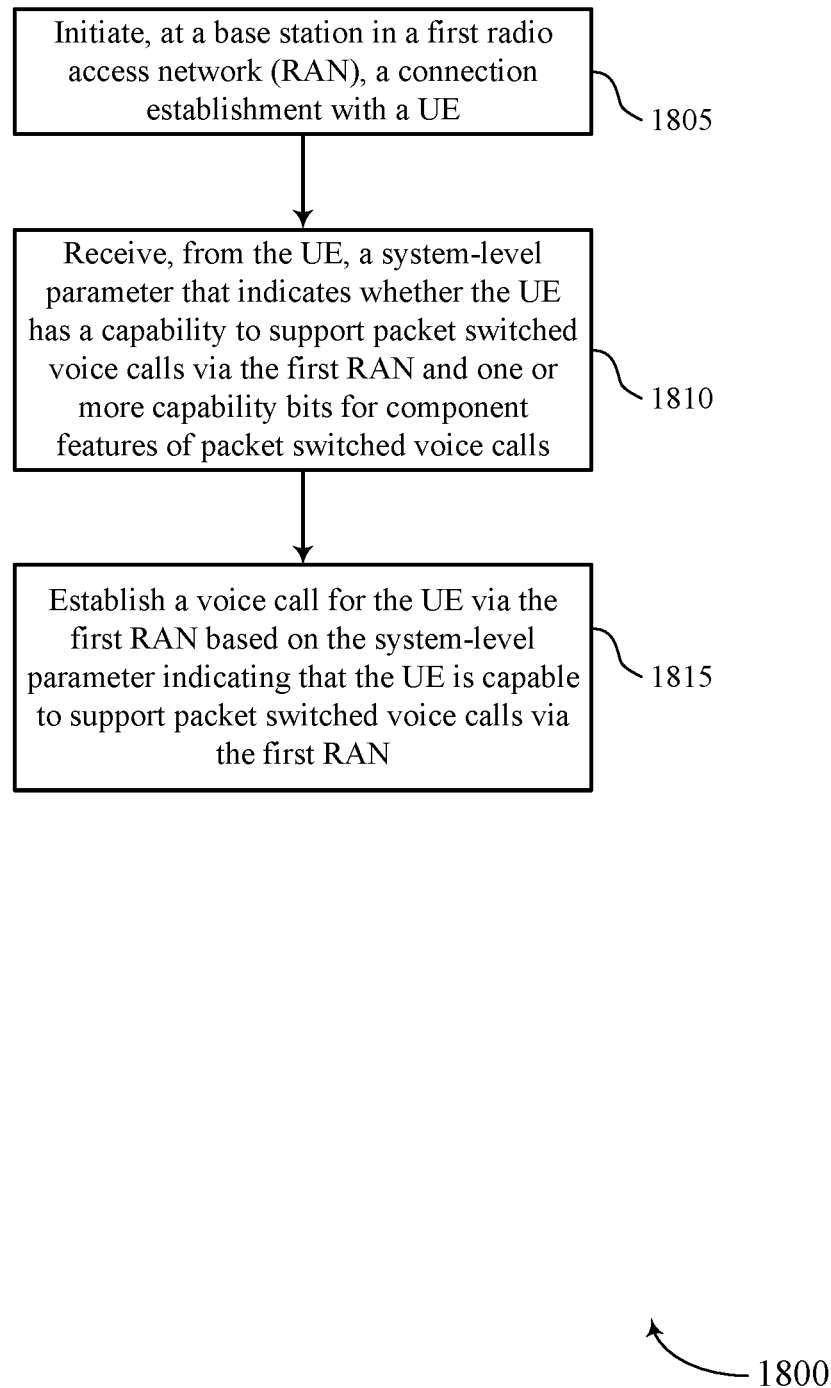

FIG. 18 shows a flowchart illustrating a method 1800 that supports packet switched voice call capability indication in wireless communications in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station in a first RAN may initiate a connection establishment with a UE. The operations of 1805 may be performed according to the methods described herein. In some examples, aspects of the operations of 1805 may be performed by a connection establishment component as described with reference to FIGS. 9 through 12.

At 1810, the base station may receive, from the UE, a system-level parameter that indicates whether the UE has a capability to support packet switched voice calls via the first RAN and one or more capability bits for component features of packet switched voice calls. The operations of 1810 may be performed according to the methods described herein. In some examples, aspects of the operations of 1810 may be performed by a UE capability component as described with reference to FIGS. 9 through 12.

At 1815, the base station may establish a voice call for the UE via the first RAN based on the system-level parameter indicating that the UE is capable to support packet switched voice calls via the first RAN. The operations of 1815 may be performed according to the methods described herein. In some examples, aspects of the operations of 1815 may be performed by a voice call manager as described with reference to FIGS. 9 through 12.

Figure 19:
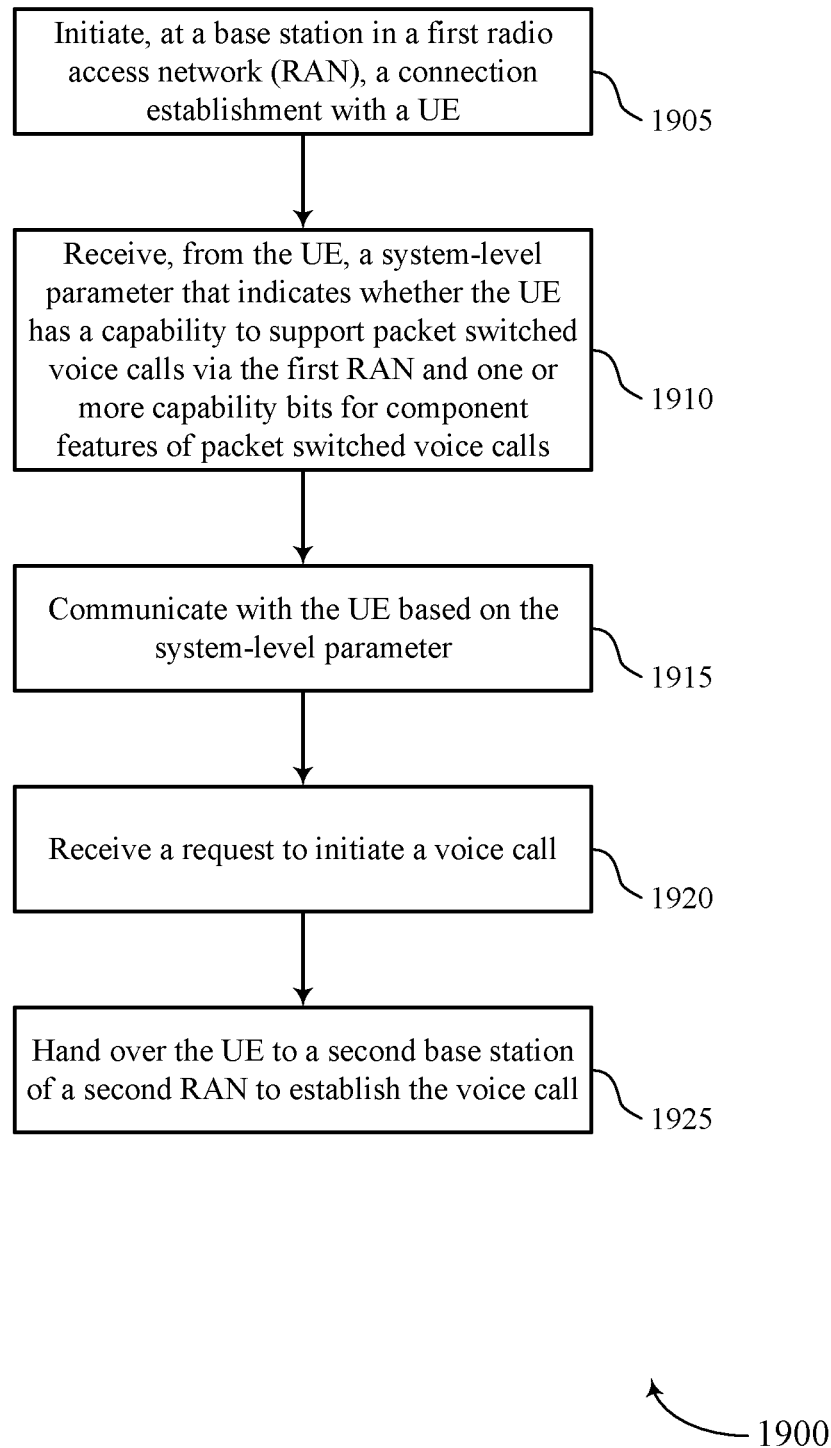

FIG. 19 shows a flowchart illustrating a method 1900 that supports packet switched voice call capability indication in wireless communications in accordance with aspects of the present disclosure. The operations of method 1900 may be implemented by a base station 105 or its components as described herein. For example, the operations of method 1900 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1905, the base station may initiate, in a first radio access network (RAN), a connection establishment with a UE. The operations of 1905 may be performed according to the methods described herein. In some examples, aspects of the operations of 1905 may be performed by a connection establishment component as described with reference to FIGS. 9 through 12.

At 1910, the base station may receive, from the UE, a system-level parameter that indicates whether the UE has a capability to support packet switched voice calls via the first RAN and one or more capability bits for component features of packet switched voice calls. The operations of 1910 may be performed according to the methods described herein. In some examples, aspects of the operations of 1910 may be performed by a UE capability component as described with reference to FIGS. 9 through 12.

At 1915, the base station may communicate with the UE based on the system-level parameter. The operations of 1915 may be performed according to the methods described herein. In some examples, aspects of the operations of 1915 may be performed by a connection establishment component as described with reference to FIGS. 9 through 12.

At 1920, the base station may receive a request to initiate a voice call. The operations of 1920 may be performed according to the methods described herein. In some examples, aspects of the operations of 1920 may be performed by a handover manager as described with reference to FIGS. 9 through 12.

At 1925, the base station may hand over the UE to a second base station of a second RAN to establish the voice call. The operations of 1925 may be performed according to the methods described herein. In some examples, aspects of the operations of 1925 may be performed by a handover manager as described with reference to FIGS. 9 through 12.

Figure 20:
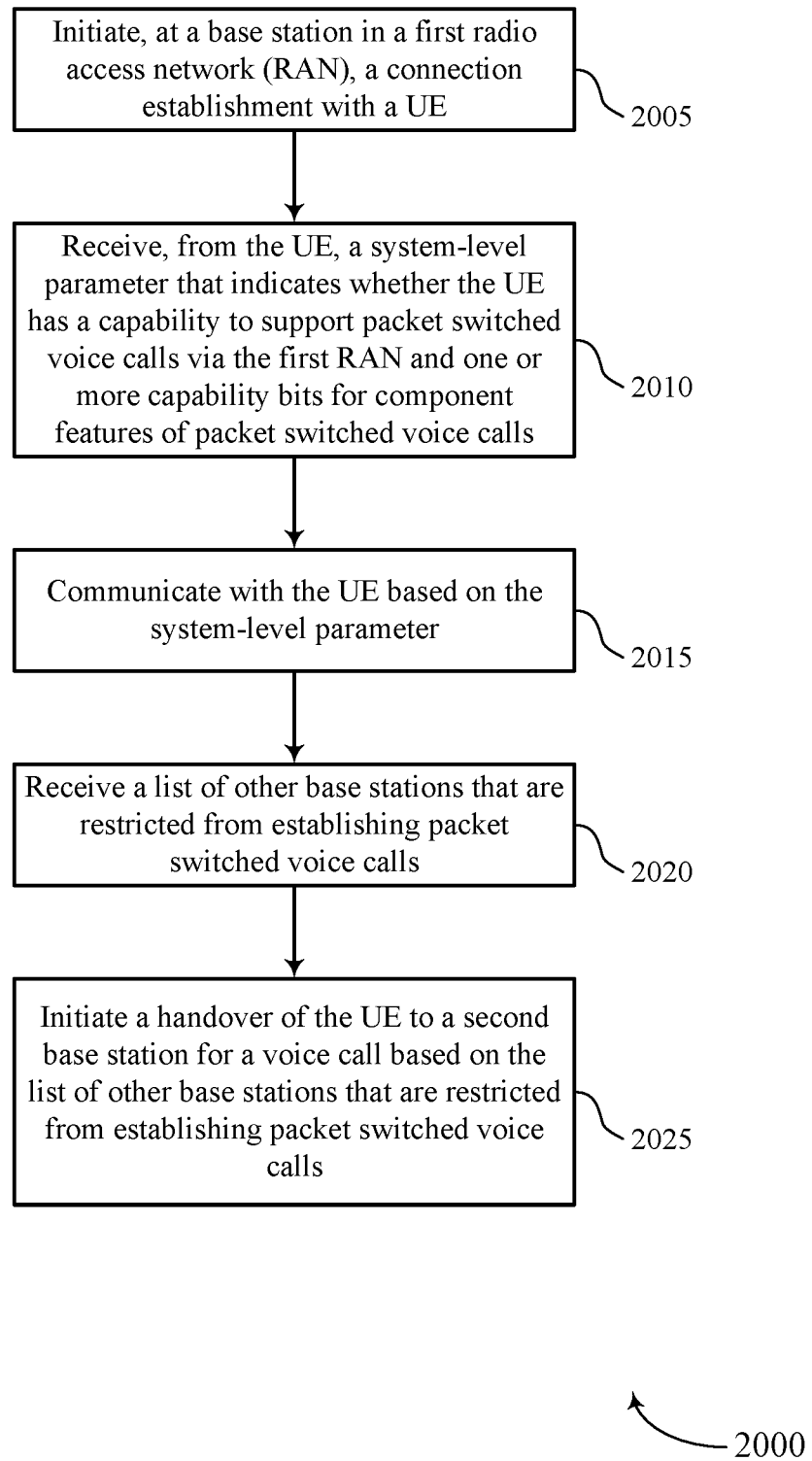

FIG. 20 shows a flowchart illustrating a method 2000 that supports packet switched voice call capability indication in wireless communications in accordance with aspects of the present disclosure. The operations of method 2000 may be implemented by a base station 105 or its components as described herein. For example, the operations of method 2000 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 2005, the base station may initiate, in a first radio access network (RAN), a connection establishment with a UE. The operations of 2005 may be performed according to the methods described herein. In some examples, aspects of the operations of 2005 may be performed by a connection establishment component as described with reference to FIGS. 9 through 12.

At 2010, the base station may receive, from the UE, a system-level parameter that indicates whether the UE has a capability to support packet switched voice calls via the first RAN and one or more capability bits for component features of packet switched voice calls. The operations of 2010 may be performed according to the methods described herein. In some examples, aspects of the operations of 2010 may be performed by a UE capability component as described with reference to FIGS. 9 through 12.

At 2015, the base station may communicate with the UE based on the system-level parameter. The operations of 2015 may be performed according to the methods described herein. In some examples, aspects of the operations of 2015 may be performed by a connection establishment component as described with reference to FIGS. 9 through 12.

At 2020, the base station may receive a list of other base stations that are restricted from establishing packet switched voice calls. The operations of 2020 may be performed according to the methods described herein. In some examples, aspects of the operations of 2020 may be performed by a restricted TA component as described with reference to FIGS. 9 through 12.

At 2025, the base station may initiate a handover of the UE to a second base station for a voice call based on the list of other base stations that are restricted from establishing packet switched voice calls. The operations of 2025 may be performed according to the methods described herein. In some examples, aspects of the operations of 2025 may be performed by a restricted TA component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Aspects of the following embodiments may be combined with any of the previous examples or aspects described herein.

Embodiment 1

A method for wireless communication at a user equipment (UE), comprising: initiating a connection establishment with a base station to establish a wireless connection using a first radio access network (RAN); transmitting, to the base station, a system-level parameter that indicates whether the UE has a capability to support packet switched voice calls via the first RAN and one or more capability bits for component features of packet switched voice calls; and communicating with the base station using the first RAN based at least in part on the system-level parameter.

Embodiment 2

The method of embodiment 1, further comprising: establishing a voice call via the first RAN based at least in part on the system-level parameter indicating that the UE is capable to support packet switched voice calls via the first RAN.

Embodiment 3

The method of embodiment 1, further comprising: receiving a handover or redirect command to a second RAN based at least in part on the system-level parameter indicating that the UE lacks the capability to support packet switched voice calls via the first RAN and that the UE does support packet switched voice calls via the second RAN.

Embodiment 4

The method of any of embodiments 1 to 3, wherein the first RAN is a 5G or new radio (NR) RAN, and the second RAN is a 4G, 3G, or 2G RAN.

Embodiment 5

The method of any of embodiments 1 to 4, wherein the transmitting further comprises: transmitting a plurality of system parameters for capabilities of vertical features that involve two or more protocol layers.

Embodiment 6

The method of any of embodiments 1 to 5, wherein: the system-level parameter includes a first capability bit that indicates UE capability to support packet switched voice calls via frequency division duplexing (FDD) using the first RAN, and wherein the transmitting further comprises: transmitting a second capability bit that indicates UE capability to support packet switched voice calls via time division duplexing (TDD) using the first RAN, and a third capability bit that indicates UE capability to support packet switched voice calls via transmissions in a higher frequency range (e.g., FR2) using the first RAN.

Embodiment 7

The method of any of embodiments 1 to 6, wherein the transmitting further comprises: transmitting an indication of a second capability of the UE to support packet switched voice calls via a second RAN.

Embodiment 8

The method of embodiment 7, wherein the indication of the second capability of the UE indicates UE capability for frequency division duplexing (FDD) for voice calls via the second RAN, time division duplexing (TDD) for voice calls via the second RAN, or combinations thereof.

Embodiment 9

The method of embodiment 7, wherein the indication of the second capability of the UE indicates UE capability for single radio voice call continuity (SRVCC) to hand over a voice call from a packet switched domain to a circuit switched domain.

Embodiment 10

The method of any of embodiments 1 to 9, further comprising: initiating a second connection establishment with a second base station to establish a second wireless connection using a second RAN; and transmitting, to the second base station, a second system-level parameter that indicates whether the UE has the capability to support packet switched voice calls via the first RAN.

Embodiment 11

An apparatus comprising at least one means for performing a method of any of embodiments 1 to 10.

Embodiment 12

An apparatus for wireless communications comprising a processor; memory in electronic communication with the processor; and instructions stored in the memory and executable by the processor to cause the apparatus to perform a method of any of embodiments 1 to 10.

Embodiment 13

A non-transitory computer-readable medium storing code for wireless communications, the code comprising instructions executable by a processor to perform a method of any of embodiments 1 to 10.

Embodiment 14

A method for wireless communication, comprising: initiating, at a base station in a first radio access network (RAN), a connection establishment with a user equipment (UE); receiving, from the UE, a system-level parameter that indicates whether the UE has a capability to support packet switched voice calls via the first RAN and one or more capability bits for component features of packet switched voice calls; and communicating with the UE based at least in part on the system-level parameter.

Embodiment 15

The method of embodiment 14, further comprising: establishing a voice call for the UE via the first RAN based at least in part on the system-level parameter indicating that the UE is capable to support packet switched voice calls via the first RAN.

Embodiment 16

The method of embodiment 14, wherein the system-level parameter indicates that the UE lacks the capability to support packet switched voice calls via the first RAN, and wherein the method further comprises: receiving a request to initiate a voice call; and handing over the UE to a second base station of a second RAN to establish the voice call.

Embodiment 17

The method of any of embodiments 14 to 16, wherein the first RAN is a 5G or new radio (NR) RAN, and the second RAN is a 4G, 3G, or 2G RAN.

Embodiment 18

The method of any of embodiments 14 to 17, wherein the receiving further comprises: receiving a plurality of system parameters for capabilities of the UE for vertical features that involve two or more protocol layers.

Embodiment 19

The method of any of embodiments 14 to 18, wherein the system-level parameter includes a first capability bit that indicates UE capability to support packet switched voice calls via frequency division duplexing (FDD) using the first RAN, and wherein the receiving further comprises: receiving, from the UE, a second capability bit that indicates UE capability to support packet switched voice calls via time division duplexing (TDD) using the first RAN, and a third capability bit that indicates UE capability to support packet switched voice calls via transmissions in a higher frequency range (e.g., FR2) using the first RAN.

Embodiment 20

The method of any of embodiments 14 to 19, wherein the receiving further comprises: receiving an indication of a second capability of the UE to support packet switched voice calls via a second RAN.

Embodiment 21

The method of embodiment 20, wherein the indication of the second capability of the UE indicates UE capability for one or more of: frequency division duplexing (FDD) for voice calls via the second RAN, time division duplexing (TDD) for voice calls via the second RAN, single radio voice call continuity (SRVCC) to hand over from an EUTRA RAN using FDD to a UTRA RAN using FDD, SRVCC from the EUTRA RAN using TDD to the UTRA RAN using FDD, SRVCC from the EUTRA RAN using FDD to the UTRA RAN using TDD, SRVCC from the EUTRA RAN using TDD to the UTRA RAN using TDD, SRVCC from the first RAN using FDD to the UTRA RAN using FDD, SRVCC from the first RAN using TDD to the UTRA RAN using FDD, SRVCC from the first RAN using FDD to the UTRA RAN using TDD, SRVCC from the first RAN using TDD to the UTRA RAN using TDD, SRVCC from the first RAN using FDD to a GERAN RAN, SRVCC from the first RAN using TDD the GERAN RAN, or combinations thereof.

Embodiment 22

The method of any of embodiments 20 to 21, further comprising: initiating a handover of the UE to a second base station of the second RAN based at least in part on the indication of the second capability of the UE.

Embodiment 23

The method of any of embodiments 14 to 22, further comprising: receiving a list of other base stations that are restricted from establishing packet switched voice calls; and initiating a handover of the UE to a second base station for a voice call based at least in part on the list of other base stations that are restricted from establishing packet switched voice calls.

Embodiment 24

An apparatus comprising at least one means for performing a method of any of embodiments 14 to 23.

Embodiment 25

An apparatus for wireless communications comprising a processor; memory in electronic communication with the processor; and instructions stored in the memory and executable by the processor to cause the apparatus to perform a method of any of embodiments 14 to 23.

Embodiment 26

A non-transitory computer-readable medium storing code for wireless communications, the code comprising instructions executable by a processor to perform a method of any of embodiments 14 to 23.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC- FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    initiating a connection establishment with an access network entity to establish a wireless connection using a first radio access network (RAN);
    transmitting, to the access network entity, a first indication of a system-level parameter that indicates whether the UE has a capability to support packet switched voice calls via the first RAN and a second indication with two or more capability bits for component features of packet switched voice calls associated with the first indication, wherein the two or more capability bits include one or more bits that each indicate UE capability for a different associated individual component feature of packet switched voice calls for the first RAN, one or more bits that each indicate UE capability for a component feature of packet switched voice calls for a second RAN, and one or more capability bits for a handover between the first RAN and the second RAN, and the second indication is different than the first indication and transmitted based at least in part on the first indication; and
    communicating using the first RAN based at least in part on the system-level parameter.

2. The method of claim 1, wherein:
    the two or more capability bits include a first capability bit that indicates UE capability to support packet switched voice calls via frequency division duplexing (FDD) using the first RAN, and wherein the transmitting further comprises:
        transmitting a second capability bit that indicates UE capability to support packet switched voice calls via time division duplexing (TDD) using the first RAN, and a third capability bit that indicates UE capability to support packet switched voice calls via transmissions in a higher frequency range using the first RAN.

3. The method of claim 1, wherein the UE indicates UE capability for frequency division duplexing (FDD) for voice calls via the second RAN, time division duplexing (TDD) for voice calls via the second RAN, or combinations thereof.

4. The method of claim 3, wherein the UE indicates UE capability for single radio voice call continuity (SRVCC) to hand over a voice call from a packet switched domain to a circuit switched domain.

5. The method of claim 1, further comprising:
    initiating a second connection establishment with a second access network entity to establish a second wireless connection using the second RAN; and
    transmitting, to the second access network entity, a second system-level parameter that indicates whether the UE has the capability to support packet switched voice calls via the first RAN.

6. The method of claim 1, further comprising:
    establishing a voice call via the first RAN based at least in part on the system-level parameter indicating that the UE is capable to support packet switched voice calls via the first RAN.

7. The method of claim 1, further comprising:
    receiving a handover or redirect command to the second RAN based at least in part on the two or more capability bits indicating that the UE lacks the capability to support packet switched voice calls via the first RAN and that the UE does support packet switched voice calls via the second RAN.

8. The method of claim 7, wherein the first RAN is a fifth generation (5G) or new radio (NR) RAN, and the second RAN is a fourth generation (4G), a third generation (3G), or a second generation (2G) RAN.

9. The method of claim 1, wherein the transmitting further comprises:
    transmitting a plurality of system parameters for capabilities of vertical features that involve two or more protocol layers.

10. A method for wireless communication, comprising:
    initiating, at an access network entity in a first radio access network (RAN), a connection establishment with a user equipment (UE);
    receiving, from the UE, a first indication of a system-level parameter that indicates whether the UE has a capability to support packet switched voice calls via the first RAN and a second indication with two or more capability bits for component features of packet switched voice calls associated with the first indication, wherein the two or more capability bits include one or more bits that each indicate UE capability for a different associated individual component feature of packet switched voice calls for the first RAN, one or more bits that each indicate UE capability for a component feature of packet switched voice calls for a second RAN, and one or more capability bits for a handover between the first RAN and the second RAN, and the second indication is different than the first indication and transmitted based at least in part on the first indication; and
communicating with the UE based at least in part on the system-level parameter.

11. The method of claim 10, wherein the two or more capability bits include a first capability bit that indicates UE capability to support packet switched voice calls via frequency division duplexing (FDD) using the first RAN, and wherein the receiving further comprises:
receiving, from the UE, a second capability bit that indicates UE capability to support packet switched voice calls via time division duplexing (TDD) using the first RAN, and a third capability bit that indicates UE capability to support packet switched voice calls via transmissions in a higher frequency range using the first RAN.

12. The method of claim 10, wherein the UE indicates UE capability for one or more of:
frequency division duplexing (FDD) for voice calls via the second RAN,
time division duplexing (TDD) for voice calls via the second RAN,
single radio voice call continuity (SRVCC) to hand over from an EUTRA RAN using FDD to a UTRA RAN using FDD,
SRVCC from the EUTRA RAN using TDD to the UTRA RAN using FDD,
SRVCC from the EUTRA RAN using FDD to the UTRA RAN using TDD,
SRVCC from the EUTRA RAN using TDD to the UTRA RAN using TDD,
SRVCC from the first RAN using FDD to the UTRA RAN using FDD,
SRVCC from the first RAN using TDD to the UTRA RAN using FDD,
SRVCC from the first RAN using FDD to the UTRA RAN using TDD,
SRVCC from the first RAN using TDD to the UTRA RAN using TDD,
SRVCC from the first RAN using FDD to a GERAN RAN,
SRVCC from the first RAN using TDD the GERAN RAN,
or combinations thereof.

13. The method of claim 12, further comprising:
initiating a handover of the UE to a second access network entity of the second RAN based at least in part on the indication of the two or more capability bits.

14. The method of claim 10, further comprising:
establishing a voice call for the UE via the first RAN based at least in part on the system-level parameter indicating that the UE is capable to support packet switched voice calls via the first RAN.

15. The method of claim 10, wherein the system-level parameter indicates that the UE lacks the capability to support packet switched voice calls via the first RAN, and wherein the method further comprises:
receiving a request to initiate a voice call; and
handing over the UE to a second access network entity of the second RAN to establish the voice call.

16. The method of claim 10, wherein the receiving further comprises:
receiving a plurality of system parameters for capabilities of the UE for vertical features that involve two or more protocol layers.

17. The method of claim 10, further comprising:
receiving a list of other access network entities that are restricted from establishing packet switched voice calls; and
initiating a handover of the UE to a second access network entity for a voice call based at least in part on the list of other access network entities that are restricted from establishing packet switched voice calls.

18. An apparatus for wireless communication at a user equipment (UE), comprising: a processor, memory in electronic communication with the processor; and instructions stored in the memory and executable by the processor to cause the apparatus to:
initiate a connection establishment with an access network entity to establish a wireless connection using a first radio access network (RAN);
transmit, to the access network entity, a first indication of a system-level parameter that indicates whether the UE has a capability to support packet switched voice calls via the first RAN and a second indication with two or more capability bits for component features of packet switched voice calls associated with the first indication, wherein the two or more capability bits include one or more bits that each indicate UE capability for a different associated individual component feature of packet switched voice calls for the first RAN, one or more bits that each indicate UE capability for a component feature of packet switched voice calls for a second RAN, and one or more capability bits for a handover between the first RAN and the second RAN, and the second indication is different than the first indication and transmitted based at least in part on the first indication; and
communicate using the first RAN based at least in part on the system-level parameter.

19. The apparatus of claim 18, wherein the instructions are further executable by the processor to cause the apparatus to:
establish a voice call via the first RAN based at least in part on the system-level parameter indicating that the UE is capable to support packet switched voice calls via the first RAN.

20. The apparatus of claim 18, wherein:
the system-level parameter includes a first capability bit that indicates UE capability to support packet switched voice calls via frequency division duplexing (FDD) using the first RAN, and
a second capability bit that indicates UE capability to support packet switched voice calls via time division duplexing (TDD) using the first RAN, and a third capability bit that indicates UE capability to support packet switched voice calls via transmissions in a higher frequency range using the first RAN.

21. The apparatus of claim 18, wherein the UE indicates UE capability for frequency division duplexing (FDD) for voice calls via the second RAN, time division duplexing (TDD) for voice calls via the second RAN, or combinations thereof.

22. The apparatus of claim 18, wherein the UE indicates UE capability for single radio voice call continuity (SRVCC) to hand over a voice call from a packet switched domain to a circuit switched domain.

23. The apparatus of claim 18, wherein the instructions are further executable by the processor to cause the apparatus to:

initiate a second connection establishment with a second access network entity to establish a second wireless connection using the second RAN; and transmit, to the second access network entity as part of the second connection establishment, a second system-level parameter that indicates whether the UE has the capability to support packet switched voice calls via the first RAN.

24. An apparatus for wireless communication, comprising: a processor, memory in electronic communication with the processor; and instructions stored in the memory and executable by the processor to cause the apparatus to:

initiate, at an access network entity in a first radio access network (RAN), a connection establishment with a user equipment (UE);

receive, from the UE, a first indication of a system-level parameter that indicates whether the UE has a capability to support packet switched voice calls via the first RAN and a second indication with two or more capability bits for component features of packet switched voice calls associated with the first indication, wherein the two or more capability bits include a one or more bits that each indicate UE capability for a different associated individual component feature of packet switched voice calls for the first RAN, one or more bits that each indicate UE capability for a component feature of packet switched voice calls for a second RAN, and one or more capability bits for a handover between the first RAN and the second RAN, and the second indication is different than the first indication and transmitted based at least in part on the first indication; and communicate with the UE based at least in part on the system-level parameter.

25. The apparatus of claim 24, wherein the two or more capability bits include a first capability bit that indicates UE capability to support packet switched voice calls via frequency division duplexing (FDD) using the first RAN, and wherein the instructions are further executable by the processor to cause the apparatus to:

receive, from the UE, a second capability bit that indicates UE capability to support packet switched voice calls via time division duplexing (TDD) using the first RAN, and a third capability bit that indicates UE capability to support packet switched voice calls via transmissions in a higher frequency range using the first RAN.

26. The apparatus of claim 25, wherein the indication of the second capability of the UE indicates UE capability for frequency division duplexing (FDD) for voice calls via the second RAN, time division duplexing (TDD) for voice calls via the second RAN, or combinations thereof.

* * * * *